United States Patent
Aibara et al.

(10) Patent No.: US 7,978,676 B2
(45) Date of Patent: Jul. 12, 2011

(54) RADIO RELAY APPARATUS, RADIO TERMINAL APPARATUS, METHOD, AND RECORDING MEDIUM FOR PERFORMING RADIO COMMUNICATION BASED ON BEACON

(75) Inventors: Takehiro Aibara, Hamura (JP); Masato Nunokawa, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 12/573,220

(22) Filed: Oct. 5, 2009

(65) Prior Publication Data

US 2010/0091698 A1    Apr. 15, 2010

(30) Foreign Application Priority Data

Oct. 9, 2008 (JP) ................. 2008-262632
Dec. 22, 2008 (JP) ................. 2008-325588

(51) Int. Cl.
*H04J 3/16* (2006.01)

(52) U.S. Cl. ........ 370/346; 370/312; 370/313; 370/314; 370/315; 370/327; 370/328; 370/329; 455/509; 455/512

(58) Field of Classification Search .................. None
See application file for complete search history.

(56) References Cited

U.S. PATENT DOCUMENTS

| | | | |
|---|---|---|---|
| 4,706,272 A | 11/1987 | Nishimura et al. | |
| 4,845,491 A | 7/1989 | Fascenda et al. | |
| 5,043,718 A | 8/1991 | Shimura | |
| 2006/0268800 A1* | 11/2006 | Sugaya et al. | 370/338 |
| 2007/0174809 A1* | 7/2007 | Brown et al. | 717/100 |

FOREIGN PATENT DOCUMENTS

| | | |
|---|---|---|
| EP | 0360216 A2 | 3/1990 |
| EP | 1519596 A2 | 3/2005 |
| GB | 2154347 A | 9/1985 |
| JP | 2002-300175 A | 10/2002 |
| JP | 2004-187002 A | 7/2004 |
| WO | WO 88/09104 A1 | 11/1988 |

OTHER PUBLICATIONS

Extended European Search Report dated Jul. 8, 2010 (in English) issued in counterpart European Application No. 09172542.4.
Anis Koubaa et al: "A Time Division Beacon Scheduling Mechanism for IEEE 802.15.4/Zigbee Cluster-Tree Wireless Sensor Networks" Real-Time Systems, 2007. ECRTS '07. 19th Euromicro Conference on, IEEE, PI, (Jul. 1, 2007), pp. 125-135, XP031115426. ISBN: 978-0-7695-2914-1.
Kun Hyun Kim et al: "Sequential Clustering-based Beacon Scheduling in Hierarchically-Extended Wireless Sensor Network" Communications, 2006 Asia-Pacific Conference on, IEEE, PI, (Aug. 1, 2006), pp. 1-5, XP 0310224244. ISBN: 978-1-4244-0573-2.
Khan S et al: "Clustered home area network: A beacon enabled IEEE 802.15.4 approach" Emerging Technologies, 2008. ICET 2008. 4th International Conference on, IEEE, Piscataway, NJ, USA, (Oct. 18, 2008), pp. 193-198, XP031420885. ISBN: 978-1-4244-2210-4.

* cited by examiner

*Primary Examiner* — Daniel J Ryman
*Assistant Examiner* — Jae Y Lee
(74) *Attorney, Agent, or Firm* — Holtz, Holtz, Goodman & Chick, PC

(57) ABSTRACT

A radio relay apparatus to periodically transmit a beacon to a radio terminal apparatus, comprises: a control section for generating a beacon including group identification information indicating a group to which a radio terminal apparatus of a reception object of the beacon belongs; and a transmission section for transmitting the generated beacon to the radio terminal apparatus.

12 Claims, 19 Drawing Sheets

FIG. 12

| TYPE OF RADIO TERMINAL APPARATUS | APPLICATION ID | MASK BIT |
|---|---|---|
| SPARE | 00h ~ 3Fh | — |
| HIGH SPEED RESPONSE | 40h | 0001h |
| SPARE | 41h ~ 7Fh | — |
| MIDDLE SPEED RESPONSE | 80h | 000Fh |
| SPARE | 81h ~ BFh | — |
| LOW SPEED RESPONSE | C0h | 00FFh |
| SPARE | C1h ~ FFh | — |

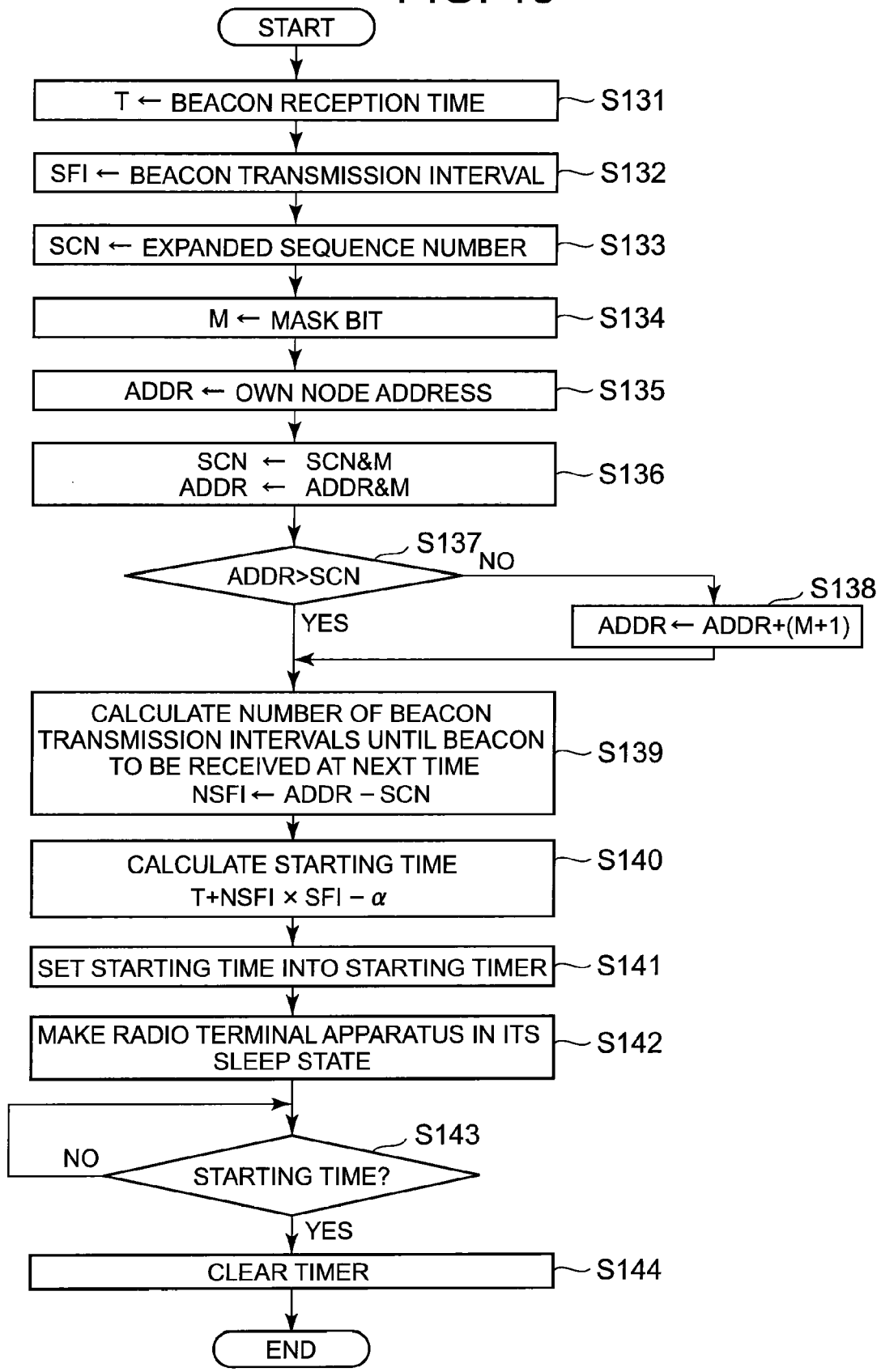

RADIO RELAY APPARATUS, RADIO TERMINAL APPARATUS, METHOD, AND RECORDING MEDIUM FOR PERFORMING RADIO COMMUNICATION BASED ON BEACON

CROSS-REFERENCE TO RELATED APPLICATIONS

This application is based on and claims the benefit of priority from the prior Japanese Patent Application No. 2008-262632, filed on Oct. 9, 2008 and the prior Japanese Patent Application No. 2008-325588, filed on Dec. 22, 2008 including specification, claims, drawings and summary, the entire contents of which are incorporated herein by reference.

BACKGROUND OF THE INVENTION

1. Field of the Invention

The present invention relates to a radio relay apparatus periodically transmitting a beacon to a radio terminal apparatus, the radio terminal apparatus receiving the beacon from the radio relay apparatus, a method for these apparatuses, and a recording medium for these apparatuses.

2. Description of the Related Art

In recent years, the development of a radio communication system for building a radio network among a plurality of electronic devices to perform information communication has been advanced. In particular, the development of the field of a small-scale radio personal area network (PAN) having a communication range about a person has been advanced, and the radio PAN has been rapidly spread among people. The radio PAN has been realized by using, for example, ZigBee (registered trademark), which standardizes a physical layer and a media access control (MAC) layer in accordance with the IEEE 802.15 standard, and Bluetooth (registered trademark), which standardizes a physical layer and a MAC layer in accordance with the IEEE 802.15.1 standard.

ZigBee has been standardized by ZigBee Alliance, and uses the specifications of the IEEE 802.15.4 standard for the physical layer and the MAC layer. Consequently, ZigBee has the following features: having a speed lower than that of Bluetooth, but having a lower price, consuming lower power, being easily set up, and enabling a radio relay apparatus to be connected to many radio terminal apparatuses.

A radio communication system using ZigBee is composed of a radio relay apparatus and radio terminal apparatuses. A beacon mode is frequently used as the communication system of the radio communication system. By the beacon mode, a radio relay apparatus periodically transmits beacon signals at a predetermined period, and all of the radio terminal apparatuses receive the beacons, so that the radio terminal apparatuses perform radio communications with the radio relay apparatus in synchronization with the received beacons.

When the radio relay apparatus transmits data to a radio terminal apparatus, the radio relay apparatus stores the address of the radio terminal apparatus to which the data is transmitted in the pending addresses in beacons to transmit the data. Then the radio terminal apparatus that has received the beacons transmits a data request to the radio relay apparatus to receive the data if its own address exists in the beacons.

The number of the addresses of radio terminal apparatuses that can be stored in a pending address is defined by the IEEE 802.15.4 standard up to seven at a maximum in the radio communication system described above. Consequently, for example, even if data is transmitted to all of the radio terminal apparatuses in a radio communication system composed of one radio relay apparatus and many, e.g. eight or more, radio terminal apparatuses, seven addresses at a maximum can be stored in one beacon. Consequently, all of the radio terminal apparatuses perform their reception operations every transmission time of the beacons although only seven radio terminal apparatuses at a maximum can receive data at one transmission of a beacon. Consequently, because the radio terminal apparatuses perform the receptions of beacons even when the radio terminal apparatuses do not need to receive data, there is the problem of useless power consumption.

BRIEF SUMMARY OF THE INVENTION

It is, therefore, a main object of the present invention to efficiently communicate between a radio relay apparatus and a radio terminal apparatus and reduce power consumption of the radio terminal apparatus.

In accordance with a first aspect of the present invention, a radio relay apparatus to periodically transmit a beacon to a radio terminal apparatus, comprises:

a control section for generating a beacon including group identification information indicating a group to which a radio terminal apparatus of a reception object of the beacon belongs; and a transmission section for transmitting the generated beacon to the radio terminal apparatus.

In accordance with a second aspect of the present invention, a radio terminal apparatus to perform communication by receiving a beacon to be periodically transmitted from a radio relay apparatus, comprising:

a reception section for receiving a beacon including group identification information indicating a group to which a radio terminal apparatus of a reception object of the beacon belongs;

an identification information storage section for storing terminal identification information for identifying the radio terminal apparatus itself; and a control section for calculating timing of starting the reception section based on the group identification information included in the beacon received by the reception section and the terminal identification information, and for causing an operation of the reception section to be stopped until the calculated timing.

According to the present invention, it is possible to efficiently communicate between a radio relay apparatus and a radio terminal apparatus and reduce power consumption of the radio terminal apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 shows an example of the combinations of the application ID and the mask bits corresponding to the types of the radio terminal apparatuses in the second embodiment;

FIG. 19 shows a flow chart of starting timing calculation processing in the second embodiment.

DETAILED DESCRIPTION OF THE INVENTION

First Embodiment

In the following, a first embodiment of the present invention will be described in detail with reference to the accompanying drawings. Incidentally, the present invention is not limited to the present embodiment. Moreover, the present embodiment of the invention is shown as a most preferable mode of the invention, and the terms of the invention are not limited to those shown in the present embodiment.

First, the configuration of the present embodiment will be described.

Figure 1:
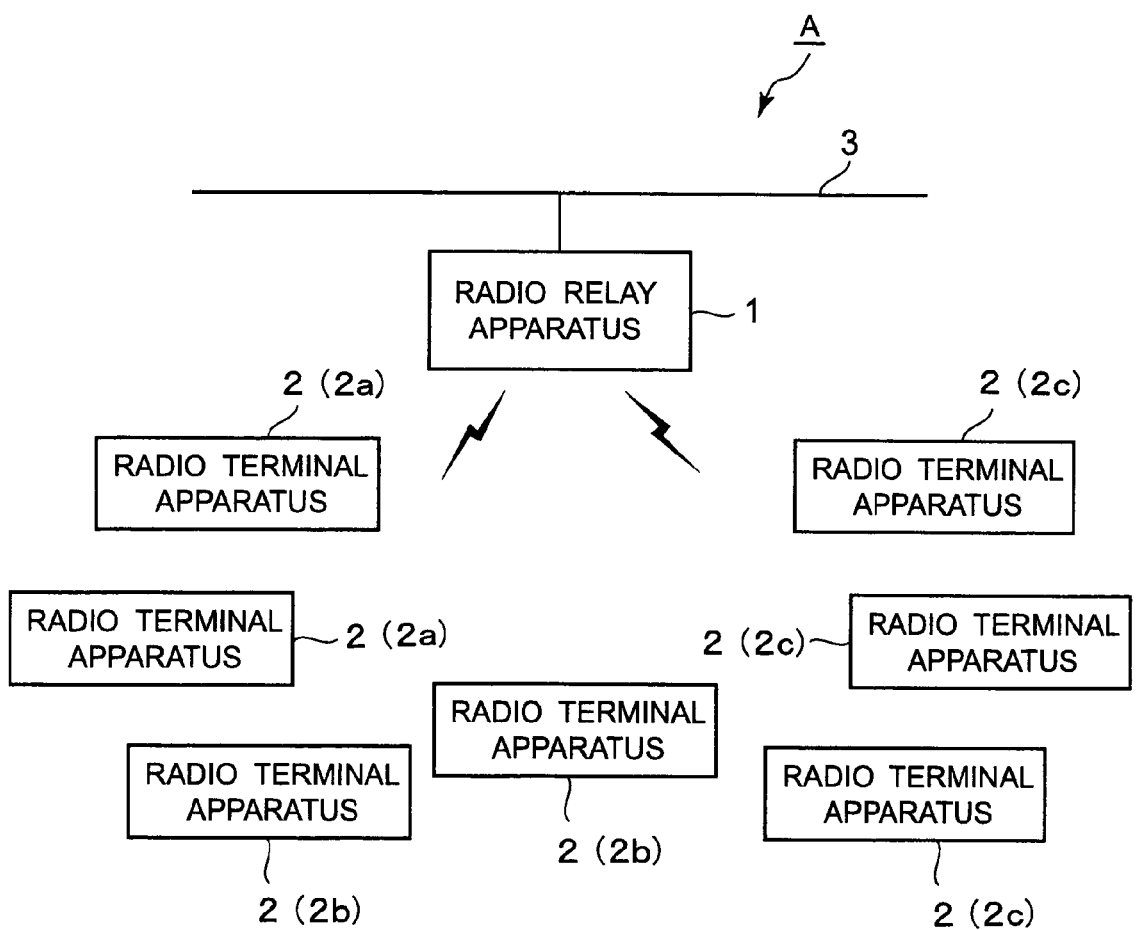
FIG. 1 shows a schematic configuration diagram of a radio communication system.

FIG. 1 shows a schematic configuration diagram of a radio communication system A according to the present embodiment.

As shown in FIG. 1, the radio communication system A includes a radio relay apparatus 1 connected to the other radio relay apparatuses or external apparatuses through a wired network 3, and a plurality of radio terminal apparatuses 2 wirelessly connected to the radio relay apparatus 1. Incidentally, the radio terminal apparatuses 2 are classified into first radio terminal apparatuses 2a for high speed responses, second radio terminal apparatuses 2b for middle speed responses, and third radio terminal apparatuses 2c for low speed responses in a second embodiment, which will be described later. The first to third radio terminal apparatuses 2a-2c are denoted by referential marks in parentheses in FIG. 1.

Figure 2:
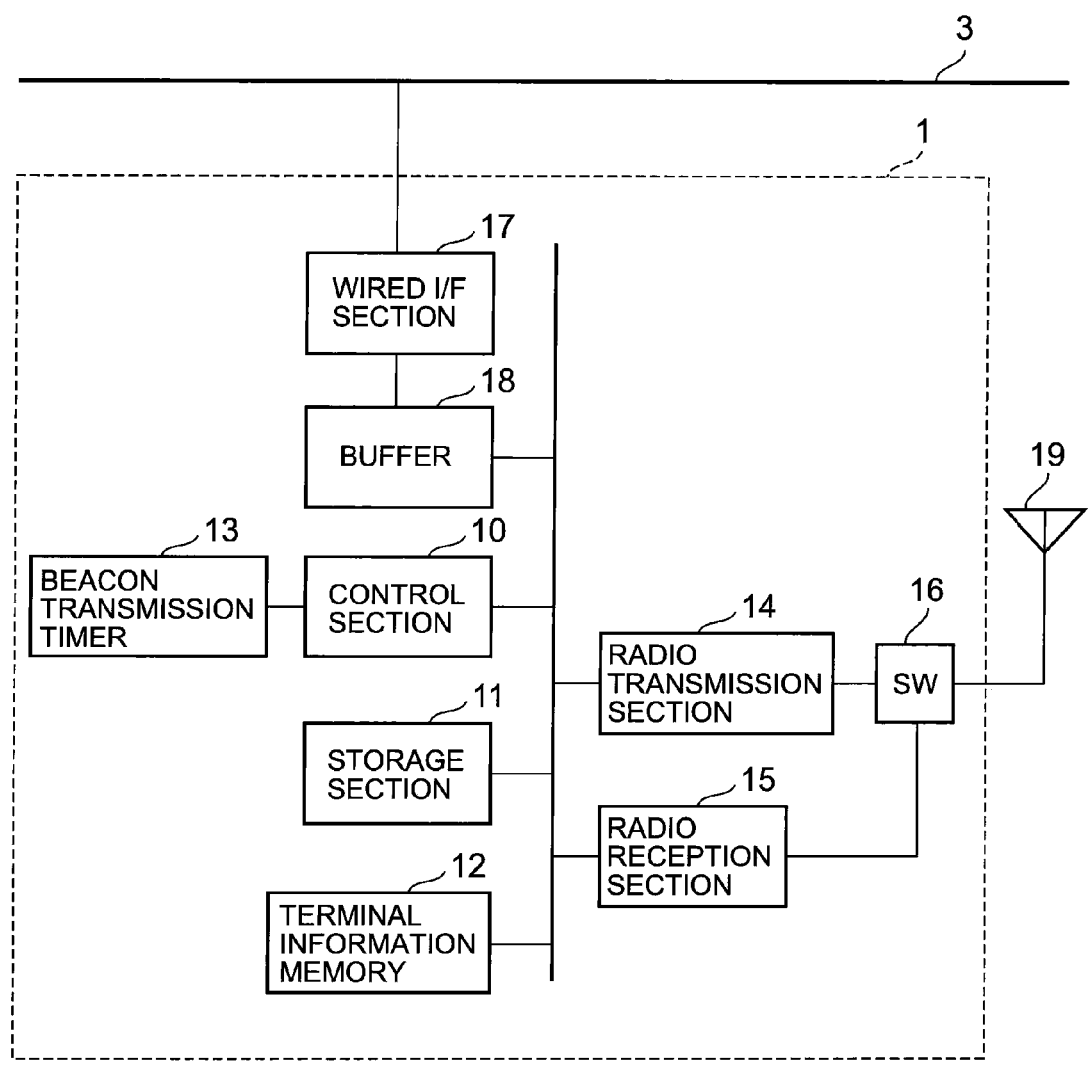
FIG. 2 shows a schematic configuration diagram of the radio relay apparatus.

FIG. 2 shows a schematic configuration diagram of the radio relay apparatus 1.

As shown in FIG. 2, the radio relay apparatus 1 includes a control section 10, a storage section 11, a terminal information memory 12, a beacon transmission timer 13, a radio transmission section 14, a radio reception section 15, a switching section (SW) 16, a wired interface (I/F) section 17, a buffer 18, an antenna 19, and the like. Each section is electrically connected to one another.

The control section 10 includes a central processing unit (CPU), a read only memory (ROM), a random access memory (RAM), and the like. The control section 10 reads a designated program, table, and data out of the various programs, various tables, various kinds of data, and the like, which are stored in the storage section 11 or the terminal information memory 12 to develop the read program and the like into the RAM, or the work area of the storage section 11 or the terminal information memory 12. The control section 10 further executes various kinds of processing in cooperation with the program mentioned above, and stores the processing results into the RAM or a predetermined region of the storage section 11 or the terminal information memory 12. The control section 10 further instructs each section of the radio relay apparatus 1 and collectively controls the whole operation of the radio relay apparatus 1.

The control section 10 generates beacons including group identification information and executes beacon transmission processing of periodically transmitting the generated beacons to the radio terminal apparatuses 2 with the radio transmission section 14. The beacons are packet data transmitted from the radio relay apparatus 1 at constant intervals for synchronizing the radio terminal apparatuses 2 connected to the radio communication system A with the radio relay apparatus 1.

Figure 3:
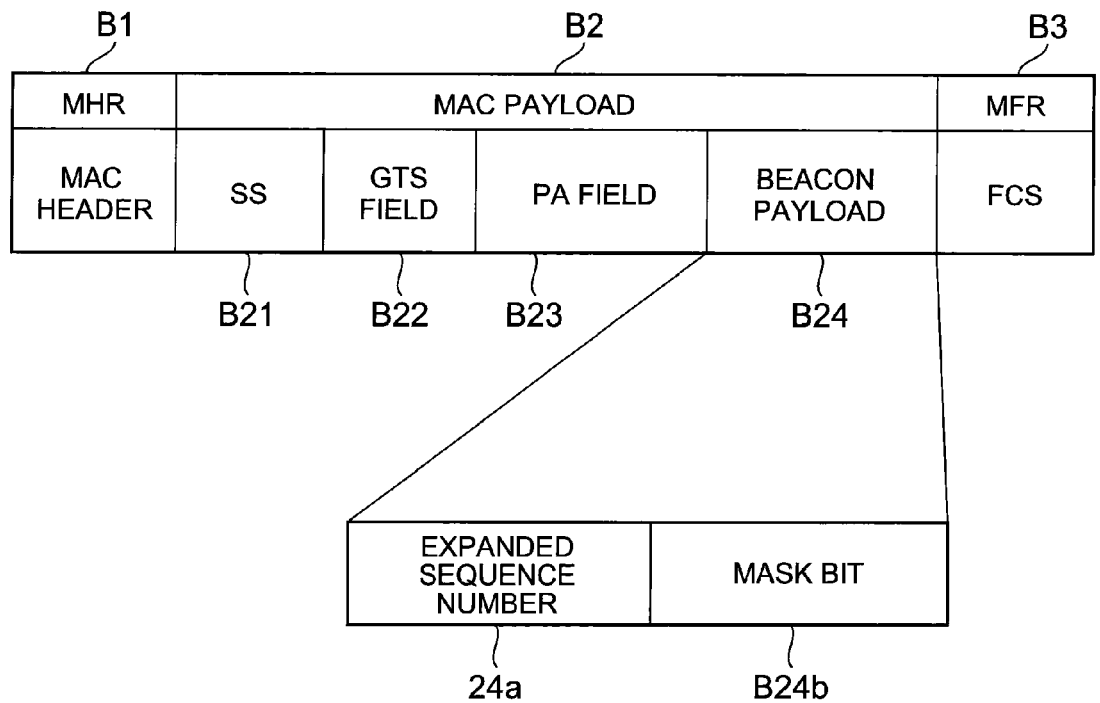
FIG. 3 shows an example of a beacon format in the first embodiment.

FIG. 3 shows an example of a beacon format in the present embodiment.

As shown in FIG. 3, a beacon includes a media access control (MAC) header region B1, a MAC payload region B2, and a MAC footer region (MFR) B3.

The MAC payload region B2 includes a superframe specification (SS) B21, a guaranteed time slot (GTS) field B22, a pending address (PA) field B23, a beacon payload B24, and the like.

The SS B21 is the detailed information field of a superframe, and a beacon transmission interval for performing the time management at the time of receiving a beacon and the communication system of a beacon are defined therein. In the GTS field B22, the information of the communication system (e.g. GTS) guaranteed to a specific radio terminal apparatus 2 is included. In the PA field B23, identification information (node address) for identifying the radio terminal apparatus 2 to which data is transmitted if the data to be transmitted to the radio terminal apparatus 2 exists is included. The beacon payload B24 includes an expanded sequence number B24a and a mask bit B24b.

The value of the expanded sequence number B24a increases every transmission time of a beacon, and the expanded sequence number B24a functions as a sequence number. The mask bit B24b defines the values to be extracted out of the expanded sequence number B24a on the basis of the total number of divided groups of the plurality of radio terminal apparatuses 2, and the mask bit B24b functions as mask information. Both the expanded sequence number B24a and the mask bit B24b function as the group identification information indicating the group to which the radio terminal apparatus 2 of the reception object of the beacon belongs.

The storage section 11 is a recording medium made of a magnetic or optical recording medium, or a nonvolatile memory made of a semiconductor or the like and capable of being electrically erased and rewritten. The storage section 11 is fixedly provided to the radio relay apparatus 1, or mounted thereon in a freely attachable and detachable state. For example, a ferroelectric random access memory (Fe RAM), a magneto resistive random access memory (M RAM), and an Ovonic unified memory (OUM: phase change recording memory using chalcogenide alloy) can be used for the storage section 11. Moreover, the storage section 11 previously stores various programs to be executed by the control section 10, various tables and data to be used by these programs, and the like. In the following first and second embodiments, each function described in the flow charts shown in FIGS. 6-8 and FIGS. 14-19 is stored in a recording medium in the form of computer (CPU) readable program codes, and the processing operations in conformity with the program codes are executed by a computer (CPU). Incidentally, it is also possible to execute the processing operations in conformity with the aforesaid program codes transmitted from the outside through a transmission medium with a computer (CPU), and the recording medium in the present embodiment is defined to include such a transmission medium.

The terminal information memory 12 is composed of a memory capable of being electrically erased and rewritten. The terminal information memory 12 stores the information such as the node addresses of the radio terminal apparatuses 2 existing in the region in which the radio relay apparatus 1 can communicate with the radio terminal apparatuses 2, and the terminal information memory 12 functions as a terminal information storage section.

The beacon transmission timer 13 is a timer for timing the transmission intervals of beacons, and outputs a beacon transmission timing signal indicating that a timed time has reached a transmission interval to the control section 10.

The radio transmission section 14 includes a modulation circuit, a radio frequency (RF) circuit, and the like. The radio transmission section 14 adjusts the transmission power of packets, and performs the coding of the data to be transmitted in accordance with the instructions from the control section 10 to form the packets. The radio transmission section 14 modulates the formed packets to transmit the modulated packets to the radio terminal apparatuses 2 through the antenna 19.

The radio reception section 15 includes a demodulation circuit, an RF circuit, and the like. The radio reception section 15 adjusts the reception sensitivity of the packets and demodulates the packets received through the antenna 19. The radio reception section 15 outputs the data obtained by analyzing the demodulated packets to the control section 10.

The SW 16 is provided between the antenna 19 and the radio transmission section 14 or the radio reception section 15, and performs the switching between the transmission of a packet from the radio transmission section 14 and the reception of a packet from the antenna 19 in conformity with the instructions from the control section 10.

The wired I/F section 17 performs the communication control for performing the communication between the radio relay apparatus 1 and the other radio relay apparatuses 1 and external apparatuses connected to the radio relay apparatus 1 through the wired network 3 by a predetermined communication system.

The buffer 18 temporarily stores the data received through the wired I/F section 17.

The antenna 19 performs the transmission of packets according to set transmission power and the reception of packets according to set reception sensitivity.

Figure 4:
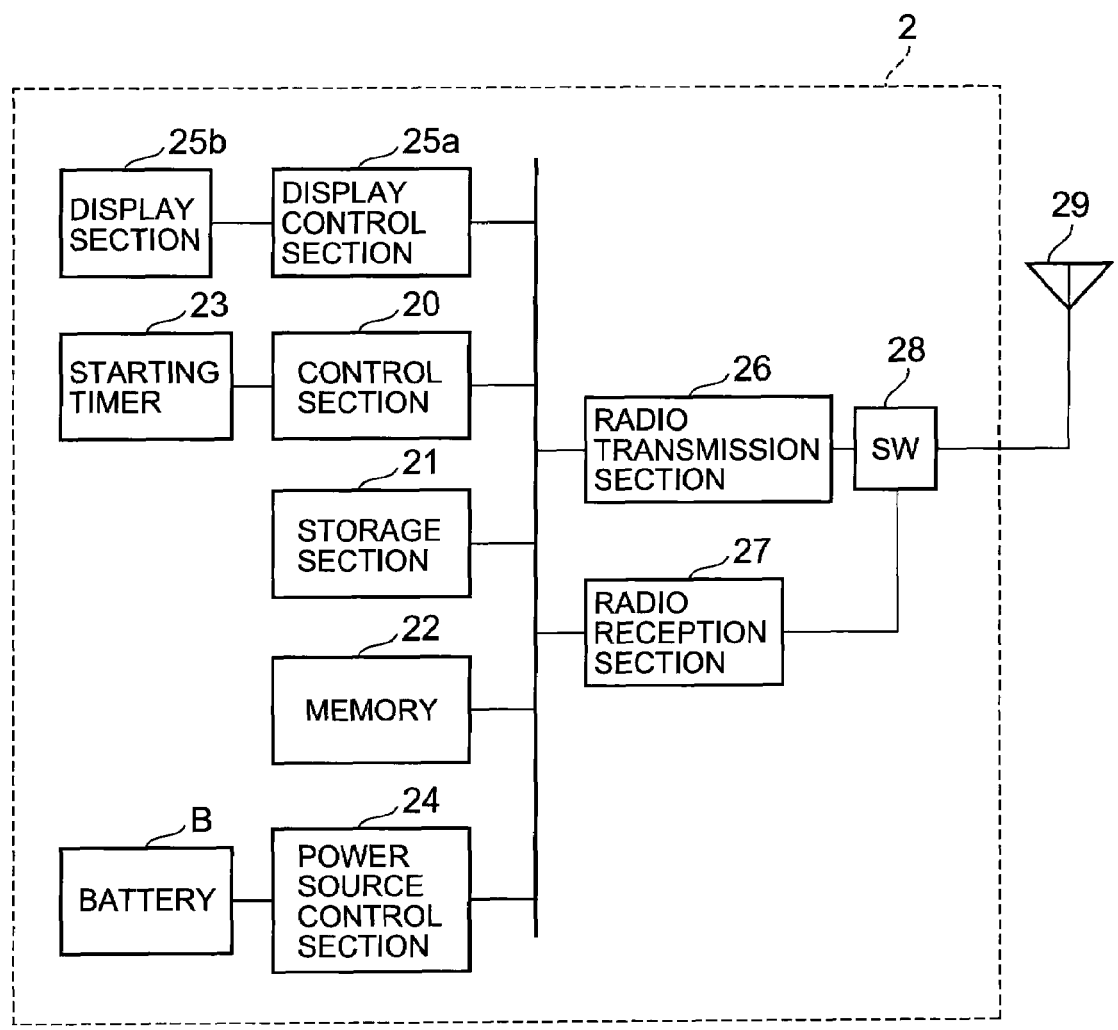
FIG. 4 shows a schematic configuration diagram of a radio terminal apparatuses.

FIG. 4 shows a schematic configuration diagram of one of the radio terminal apparatuses 2.

As shown in FIG. 4, the radio terminal apparatus 2 includes a control section 20, a storage section 21, a memory 22, a starting timer 23, a power source control section 24, a display control section 25a, a display section 25b, a radio transmission section 26, a radio reception section 27, a switching section (SW) 28, an antenna 29, and the like, and each section is electrically connected to one another. Moreover, the radio terminal apparatus 2 includes a battery B, and electric power is supplied from the battery B to each section in conformity with a control signal from the power source control section 24.

The control section 20 includes a CPU, a ROM, a RAM, and the like, and reads a designated program, table, or data out of various programs, tables, and data stored in the storage section 21 to develop the read program, table, or data in the RAM or the work area in the storage section 21. The control section 20 further executes various processing in cooperation with the program, and stores the processing results into the RAM or a predetermined region in the storage section 21. The control section 20 further instructs each section in the radio terminal apparatus 2 to collectively control the whole operation of the radio terminal apparatus 2.

The control section 20 executes the beacon reception processing of calculating the timing of starting the radio reception section 27 (starting timing) on the basis of the group identification information (expanded sequence number B24a and mask bit B24b) included in the beacon received by the radio reception section 27 and the own node address held in the memory 22, and of causing the operation of the radio reception section 27 to be stopped until the calculated starting timing.

As the calculation of the starting timing, the control section 20 calculates the difference value between a first calculation value indicating a value extracted from the expanded sequence number B24a on the basis of the mask bit B24b and a second calculation value indicating a value extracted from its own node address on the basis of the mask bit B24b, and calculates a third calculation value indicating a value obtained by multiplying the preset interval of transmitting beacons (beacon interval) by the difference value. Then, the control section 20 calculates the time obtained by adding the third calculation value to the time (T) of receiving a beacon as the starting timing.

Furthermore, the control section 20 judges whether a beacon received with the radio reception section 27 is addressed to the group to which the radio terminal apparatus 2 belongs or not on the basis of the expanded sequence number B24a and the mask bit B24b of the beacon and the node address. Then, if the beacon received with the radio reception section 27 is the one addressed to the group to which the radio terminal apparatus 2 belongs, and if the PA field B23 of the beacon includes the node address of the radio terminal apparatus 2, then the control section 20 executes the processing of transmitting a data request to the radio relay apparatus 1 with the radio transmission section 26 and of receiving the data from the radio relay apparatus 1 with the radio reception section 27.

Figure 5:
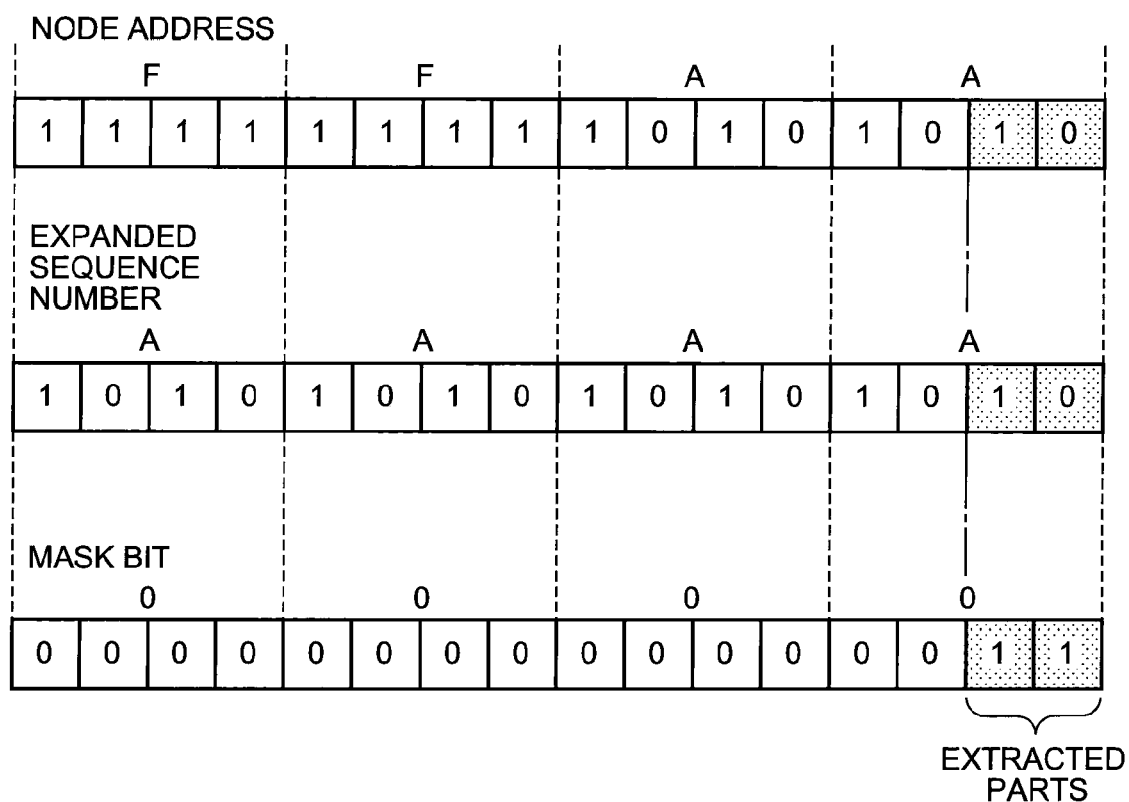
FIG. 5 shows an example of each of an expanded sequence number, a mask bit, and a node address in the first embodiment.

FIG. 5 shows an example of each of the expanded sequence number B24a, the mask bit B24b, and the node address. The calculation examples of the first calculation value and the second calculation value will be described with reference to FIG. 5.

As shown in FIG. 5, each of the expanded sequence number B24a, the mask bit B24b, and the node address is set to be a binary number of two bytes (16 bits). With reference to FIG. 5, the description will be given to the example of the case where the expanded sequence number B24a is expressed as "AAAA"; the mask bit B24b is expressed as "0003"; and the node address is expressed as "FFAA" by hexadecimal numbers. The values of the hexadecimal numbers corresponding to the values of the binary numbers are shown every four bits in FIG. 5.

The first calculation value is the one obtained by the logical operation of the "AND" of the expanded sequence number B24a and the mask bit B24b. In FIG. 5, the value "10" of the bits subjected to half-tone dot meshing of the expanded sequence number B24a corresponding to the bits of the values "1" of the mask bit B24b is calculated as the first calculation value. Moreover, the second calculation value is the one obtained by the logical operation of the "AND" of the node address and the mask bit B24b. In FIG. 5, the value "10" of the bits subjected to half-tone dot meshing of the node address corresponding to the bits of the values "1" of the mask bit B24b is calculated as the second calculation value.

If the lower order two bits of the mask bit B24b are "1," the first and second calculation values that are extracted from the expanded sequence number B24a and the node address are four of "00," "01," "10," and "11." Accordingly, the control section 20 identifies the plurality of radio terminal apparatuses 2 by classifying them into the groups composed of the radio terminal apparatuses 2 having the same lower order two bits of the node addresses on the basis of the mask bit B24b and the node address. If the lower order two bits of the mask bit B24b are "1," then the plurality of radio terminal apparatuses 2 is classified into four groups.

The value of the mask bit B24b (the number of bits of "1" of the mask bit B24b is changed according to the number of the radio terminal apparatuses 2 connectable to the radio relay apparatus 1 to transmit beacons. The IEEE 802.15.4 standard defines that seven node addresses at a maximum are stored in one beacon, and accordingly the value of the mask bit B24b is determined in accordance with the total number of the radio terminal apparatuses 2 and a multiple of "7."

If the calculated first calculation value and the second calculation value agree with each other, the control section 20 judges that the received beacon is the one addressed to the group to which the radio terminal apparatus 2 belongs.

The storage section 21 is composed of a magnetic or optical recording medium, or an electrically erasable and rewritable nonvolatile memory made of a semiconductor or the like, and is fixedly provided to the radio terminal apparatus 2 or is mounted thereon in the state of being freely attachable and detachable. For example, a ferroelectric random access memory (Fe RAM), a magneto resistive random access memory (M RAM), and an OUM (phase change recording memory made of chalcogenide alloy) can be given as the storage section 21. Moreover, the storage section 21 previously stores various programs to be executed by the control section 20, various tables and data to be used by these programs, and the like.

The memory 22 is composed of an electrically erasable and rewritable nonvolatile memory. The memory 22 stores terminal identification information (node address) for the identification of the radio terminal apparatus 2 itself, and the memory 22 functions as an identification information storage section.

The starting timer 23 is a timer for timing the starting timing (starting time) of the radio reception section 27 calculated by the control section 20, and outputs a starting timing signal indicating the fact of reaching the starting timing to the control section 20.

The power source control section 24 controls the power source of the whole radio terminal apparatus 2 in conformity with an instruction from the control section 20 to supply electric power from the battery B to each section of the radio terminal apparatus 2.

The battery B is, for example, a primary battery, such as an alkaline battery and a manganese battery, a secondary battery, such as a nickel cadmium battery, a nickel hydrogen battery, and a lithium ion battery, and the like.

The display control section 25a makes the display section 25b display various kinds of information in conformity with the display instructions input from the control section 20.

The display section 25b is composed of a liquid crystal display (LCD) or an electro luminescence (EL) display, and displays various screens on the display according to the signals input from the display control section 25a.

The radio transmission section 26 includes a modulation circuit, a radio frequency (RF) circuit, and the like. The radio transmission section 26 adjusts the transmission power of a packet, and forms a packet by coding the data to be transmitted in conformity with the instruction from the control section 20. The radio transmission section 26 modulates the formed packet, and transmits the packet to the radio relay apparatus 1 through the antenna 29.

The radio reception section 27 includes a demodulation circuit, an RF circuit, and the like. The radio reception section 27 adjusts the reception sensitivity of a packet, and demodulates the packet received through the antenna 29. The radio reception section 27 outputs the data obtained by analyzing the demodulated packet to the control section 20.

The SW 28 is provided between the antenna 29 and the radio transmission section 26 or the radio reception section 27, and performs the switching between the transmission of a packet from the radio transmission section 26 and the reception of a packet from the antenna 29 in conformity with an instruction from the control section 20.

The antenna 29 transmits a packet according to set transmission power and receives a packet according to set reception sensitivity.

Next, the operation of the present embodiment will be described with reference to FIGS. 6-8.

Figure 6:
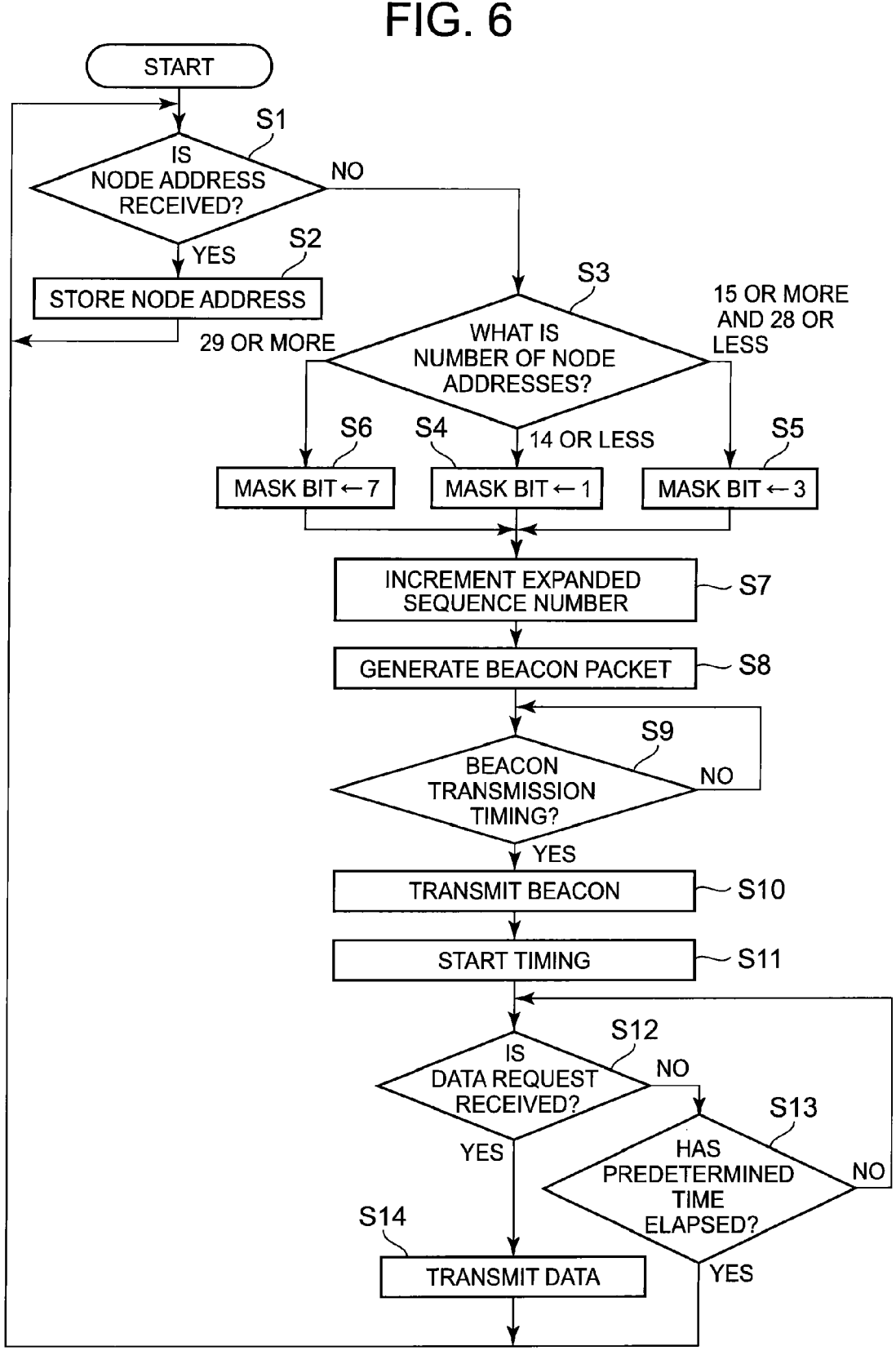
FIG. 6 shows a flow chart of a beacon transmission processing to be executed by the radio relay apparatus in the first embodiment.

FIG. 6 shows a flow chart of the beacon transmission processing to be executed by the radio relay apparatus 1. Incidentally, the processing shown in FIG. 6 is executed in cooperation with the control section 10 and each section in the radio relay apparatus 1, and the processing is executed during the supply of electric power to the radio relay apparatus 1.

Incidentally, it is supposed in the present embodiment that the number of the node addresses stored in the terminal information memory 12 does not exceed 56.

First, the control section 10 judges whether a packet including a node address is received from a radio terminal apparatus 2 through the radio reception section 15 or not (Step S1). If the packet including the node address is received (Step S1: YES), the control section 10 stores the node address included in the received packet into the terminal information memory 12 (Step S2), and returns the processing to that at Step S1.

If no packets including node addresses are received (Step S1: NO), then the control section 10 sets the value of the mask bit B24b according to the number of the node addresses stored in the terminal information memory 12, i.e. the number of the connectable radio terminal apparatuses 2 (Steps S3-S6).

If the number of the node addresses is 14 or less, the control section 10 sets the value indicated by the mask bit B24b to "1" (sets the lower order one bit of the mask bit B24b to "1") (Step S4). 14 radio terminal apparatuses 2 at a maximum are classified into two groups: one composed of the radio terminal apparatuses 2 each having the lower order one bit of the node address of "0," and the other composed of the radio terminal apparatuses 2 each having the lower order one bit of the node address of "1" by the processing at Step S4.

If the number of the node addresses is in the range from 15 to 28, both inclusive, then the control section 10 sets the value indicated by the mask bit B24b to "3" (sets the lower order two bits of the mask bit B24b to "1") (Step S5). 28 radio terminal apparatuses 2 at a maximum are classified into four groups of the radio terminal apparatuses 2 each having the lower order two bits of the node addresses of "00," "01," "10," and "11" by the processing at Step S5.

If the number of the node addresses is 29 or more, then the control section 10 sets the value indicated by the mask bit B24b to "7" (sets the lower order three bits of the mask bit B24b to "1") (Step S6). 56 radio terminal apparatuses 2 at a maximum are classified into eight groups of the radio terminal apparatuses 2 each having the lower order three bits of "000," "001," "010," "011," "100," "101," "110," and "111" by the processing at Step S6.

After the setting of the mask bit B24b, the control section 10 increments the expanded sequence number B24a (Step S7), and generates a beacon packet including the set mask bit B24b and the expanded sequence number B24a (Step S8).

The control section 10 judges whether a beacon transmission timing signal has been input from the beacon transmission timer 13 or not (Step S9). If the beacon transmission timing signal has not been input (Step S9: NO), the control section 10 returns the processing to that at Step S9.

If the beacon transmission timing signal has been input (Step S9: YES), the control section 10 makes the radio transmission section 14 transmit the generated beacon through the antenna 19 (Step S10), and clears the beacon transmission timer 13 to start the timing of a beacon transmission interval (Step S11).

The control section 10 judges whether a data request has been received from a radio terminal apparatus 2 through the radio reception section 15 or not (Step S12).

If no data requests are received (Step S12: NO), the control section 10 judges whether a preset time (predetermined time) has elapsed from the timing of the beacon transmission timer or not (Step S13). If the predetermined time has not elapsed (Step S13: NO), the control section 10 returns the processing to that at Step S12. If the predetermined time has elapsed (Step S13: YES), the control section 10 returns the processing to that at Step S1.

If a data request is received (Step S12: YES), then the control section 10 generates the data addressed to the radio terminal apparatus 2 that has transmitted the data request, and transmits the generated data to the radio terminal apparatus 2 (Step S14). Then, the control section 10 returns the processing to that at Step S1.

As described above, the radio relay apparatus 1 determines the mask bit B24b indicating the total number of the groups to which the radio terminal apparatuses 2 belong according to the number of the radio terminal apparatuses 2 that can perform communication, and the radio relay apparatus 1 can periodically transmit the beacons each including the mask bit B24b and the expanded sequence number B24a to the radio terminal apparatus 2.

Figure 7:
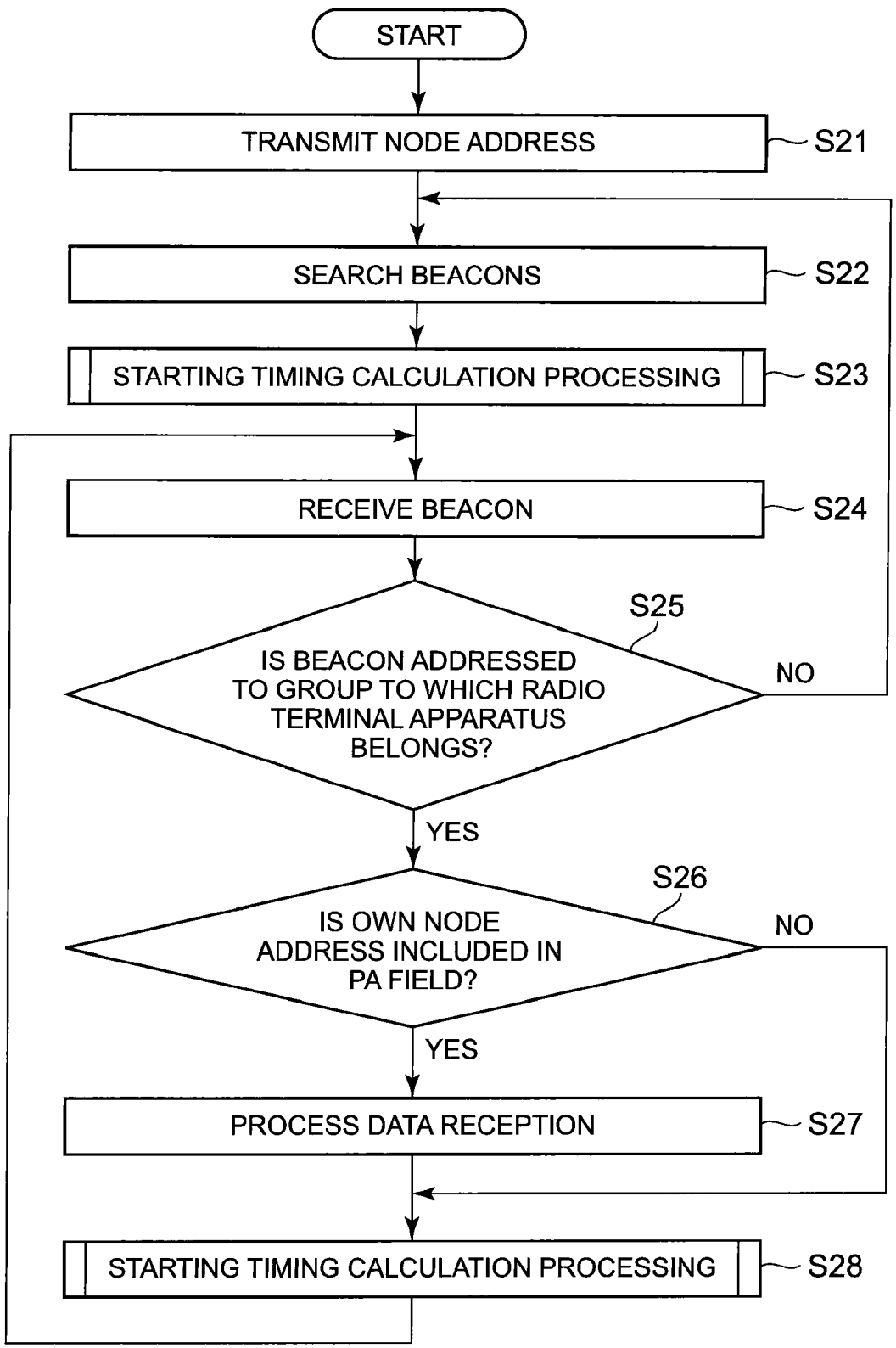
FIG. 7 shows a flow chart of beacon reception processing to be executed in the radio terminal apparatus in the first embodiment.

FIG. 7 shows a flow chart of beacon reception processing to be executed in each of the radio terminal apparatuses 2. Incidentally, the processing shown in FIG. 7 is executed in cooperation with the control section 20 and each section in the radio terminal apparatus 2, and is executed during electric power is supplied to the radio terminal apparatus 2.

The control section 20 generates a packet including its own node address stored in the memory 22, and transmits the generated packet to the radio relay apparatus 1 through the radio transmission section 26 (Step S21).

The control section 20 searches for beacons (beacon search) periodically transmitted from the radio relay apparatus 1 in order to secure the radio circuit with the radio relay apparatus 1 (Step S22). When the radio circuit with the radio relay apparatus 1 is secured after the end of the beacon search, the control section 20 executes starting timing calculation processing, which will be described later (Step S23).

When the control section 20 receives a beacon with the radio reception section 27 (Step S24), the control section 20 judges whether the received beacon is addressed to the group to which the control section 20 itself belongs or not on the basis of the analysis result of the beacon by the radio reception section (Step S25).

At Step S25, the control section 20 extracts the expanded sequence number B24a and the mask bit B24b from the received beacon. Then, the control section 20 judges whether the first calculation value calculated on the basis of the expanded sequence number B24a and the mask bit B24b included in the beacon agrees with the second calculation value calculated on the basis of its own node address and the mask bit B24b or not. If the first calculation value agrees with the second calculation value, the control section 20 judges that the received beacon is the one addressed to the group to which the own radio terminal apparatus 2 belongs.

If the received beacon is not the one addressed to the group to which the own radio terminal apparatus 2 does not belong (Step S25: NO), the control section 20 returns the processing to that at Step S22.

If the received beacon is the one addressed to the group to which the own radio terminal apparatus 2 belongs (Step S25: YES), then the control section 20 judges whether its own node address is included in the PA field B23 of the received beacon or not (Step S26).

If the own node address is not included in the PA field B23 of the received beacon (Step S26: NO), then the control section 20 advances the processing to that at Step S28.

If the own node address is included in the PA field B23 of the received beacon (Step S26: YES), then the control section 20 executes data reception processing (Step S27). The data reception processing Step S27 is the processing of transmitting a data request packet indicating a transmission request of data to the radio relay apparatus 1 and of receiving the packet of the data transmitted from the radio relay apparatus 1 in response to the packet.

The control section 10 executes the starting timing calculation processing after the decision of NO at Step S26 or after the processing at Step S27 (Step S28), and returns the processing to that at Step S24.

Figure 8:
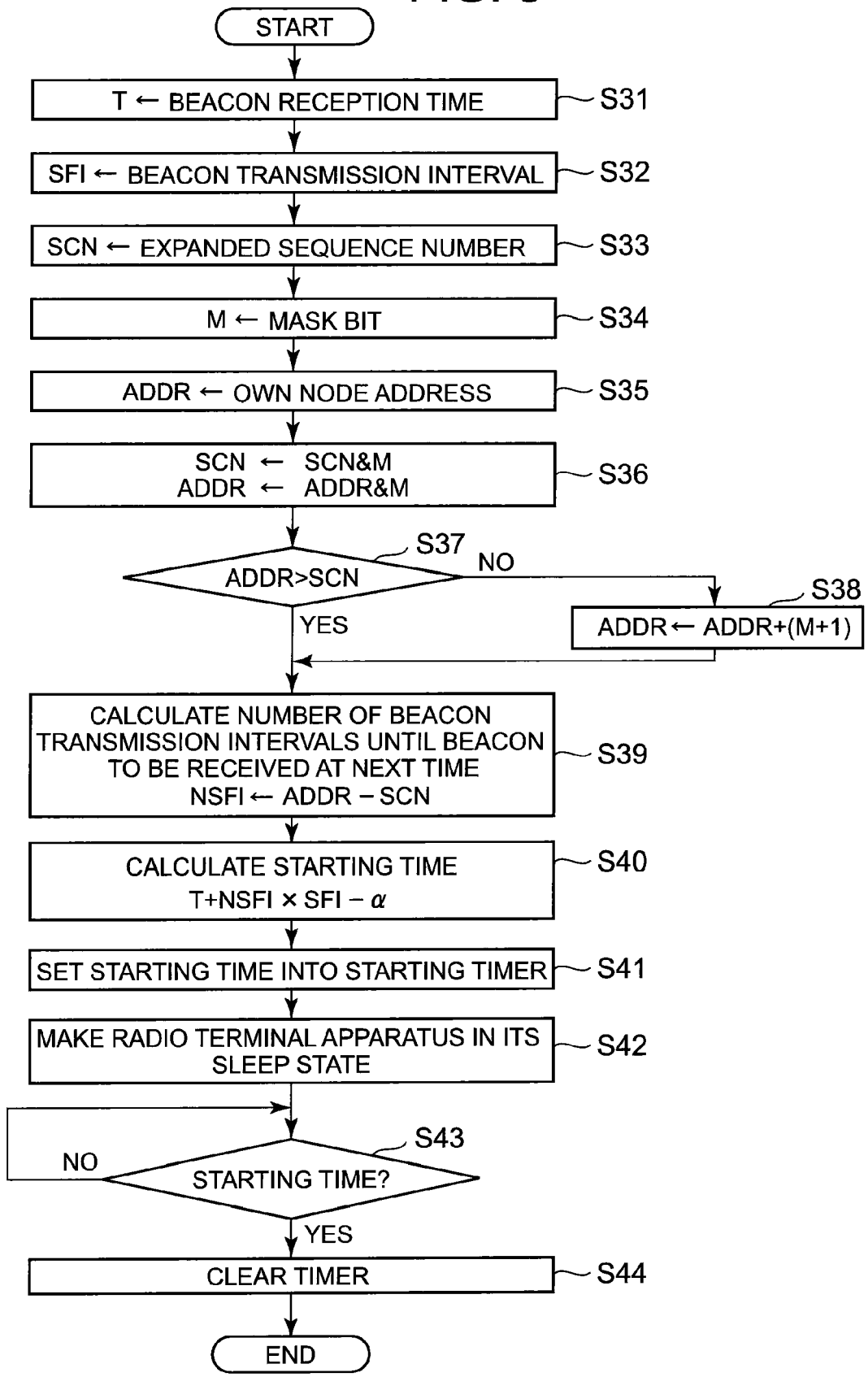
FIG. 8 shows a flow chart of starting timing calculation processing in the first embodiment.

FIG. 8 shows a flow chart of the starting timing calculation processing. Incidentally, the processing shown in FIG. 8 is executed in cooperation with the control section 20 and each section in the radio terminal apparatus 2.

The control section 20 sets the time when the radio terminal apparatus 2 has received a beacon from the radio relay apparatus 1 to T (Step S31), and sets the beacon transmission interval included in the received beacon to SFI (Step S32).

Moreover, the control section 20 sets the expanded sequence number B24*a* included in the beacon payload of the received beacon to SCN (Step S33), and sets the mask bit B24*b* to M (Step S34). Furthermore, the control section 20 sets its own node address to ADDR (Step S35).

The control section 20 sets the value of the AND of the SCN and the M to SCN, and sets the value of the AND of the ADDR and the M to ADDR (Step S36). The SCN set by the processing at Step S36 corresponds to the first calculation value, and the ADDR corresponds to the second calculation value.

The control section 20 judges whether the ADDR is larger than the SCN (Step S37). If the ADDR is equal to or less than the SCN (Step S37: NO), then the control section 20 adds the ADDR to the value obtained by adding 1 to M, and sets a new ADDR (Step S38). For example, if the M is "11" and the ADDR is "10" at Step S38, then, if 1 is added to the M, the M becomes "100." Then, "110" obtained by adding the value "10" of the ADDR to "100" is set to the new ADDR.

If the ADDR is larger than the SCN (Step S37: YES), or after Step S38, the control section 20 set a value (difference value) obtained by subtracting the SCN from the ADDR to NSFI (Step S39). The NSFI is the number indicating the beacon transmission interval from the reception of a beacon to the reception of the next beacon. For example, if the ADDR is "10" and the SCN is "00," then the NSFI is "10." In this case, if the NSFI is expressed by a decimal number, then the NSFI is expressed as "2." Consequently, the number indicating the beacon transmission interval from the reception of a beacon to the reception of the next beacon, i.e. the NSFI, is set to "2."

The control section 20 adds the T to the value (third calculation value) obtained by multiplying the NSFI by the SFI and subtracting a preset float a from the product to calculate starting timing (starting time) (Step S40). The control section 20 sets the calculated starting timing into the starting timer 23 (Step S41), and starts timing by the starting timer 23. The control section 20 sets the power supply to each section, such as the radio transmission section 26 and the radio reception section 27, to a minimum, and causes the operations of the radio transmission section 26 to be stopped, the radio reception section 27, and the like to make the radio terminal apparatus 2 in its sleep state (Step S42).

The control section 20 judges whether the time is a starting time or not by judging whether a starting timing signal has been input from the starting timer 23 or not (Step S43). If the time is not a starting time (Step S43: NO), the control section 20 returns the processing to that at Step S43.

If the time is a starting time (Step S43: YES), the control section 20 clears the starting timer 23, and starts each section, which is in each sleep state (Step S44). Then, the control section 20 ends the present processing.

Figure 9:
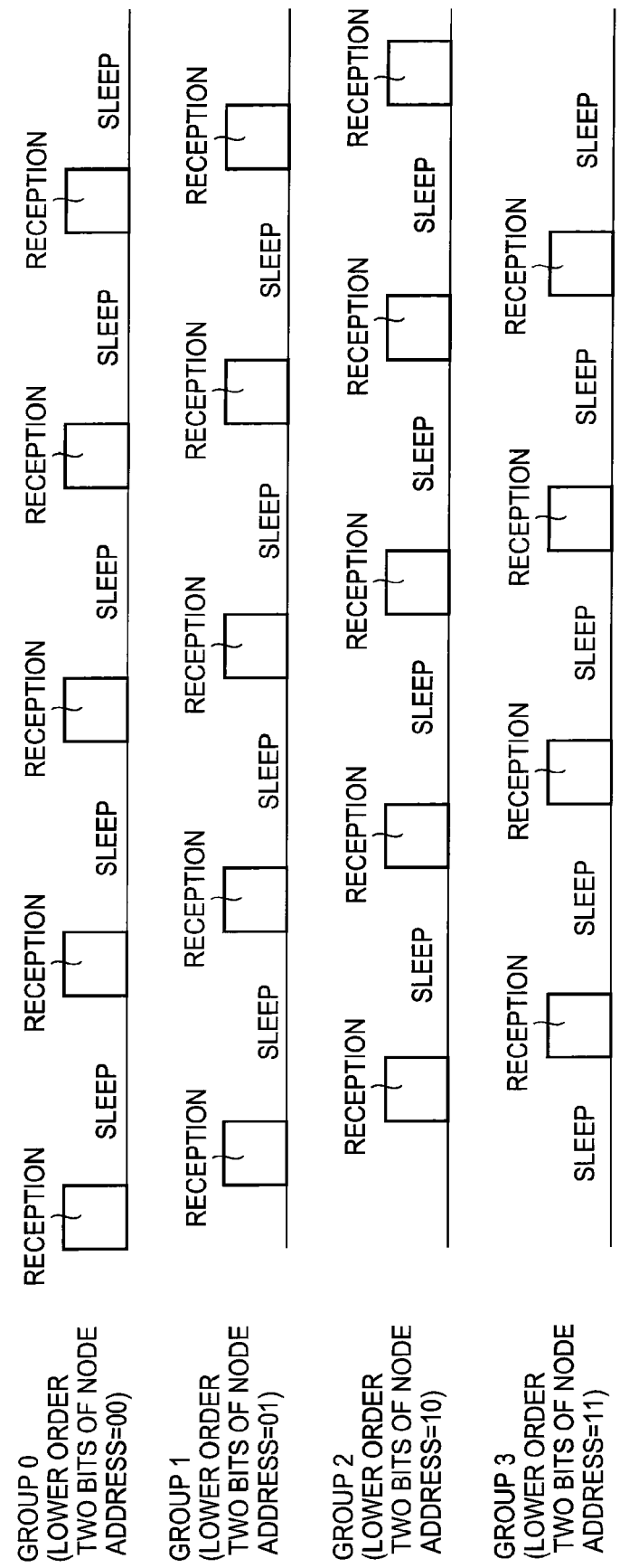
FIG. 9 shows an operation example of the radio terminal apparatus performing beacon reception processing in the first embodiment.
Figure 10:
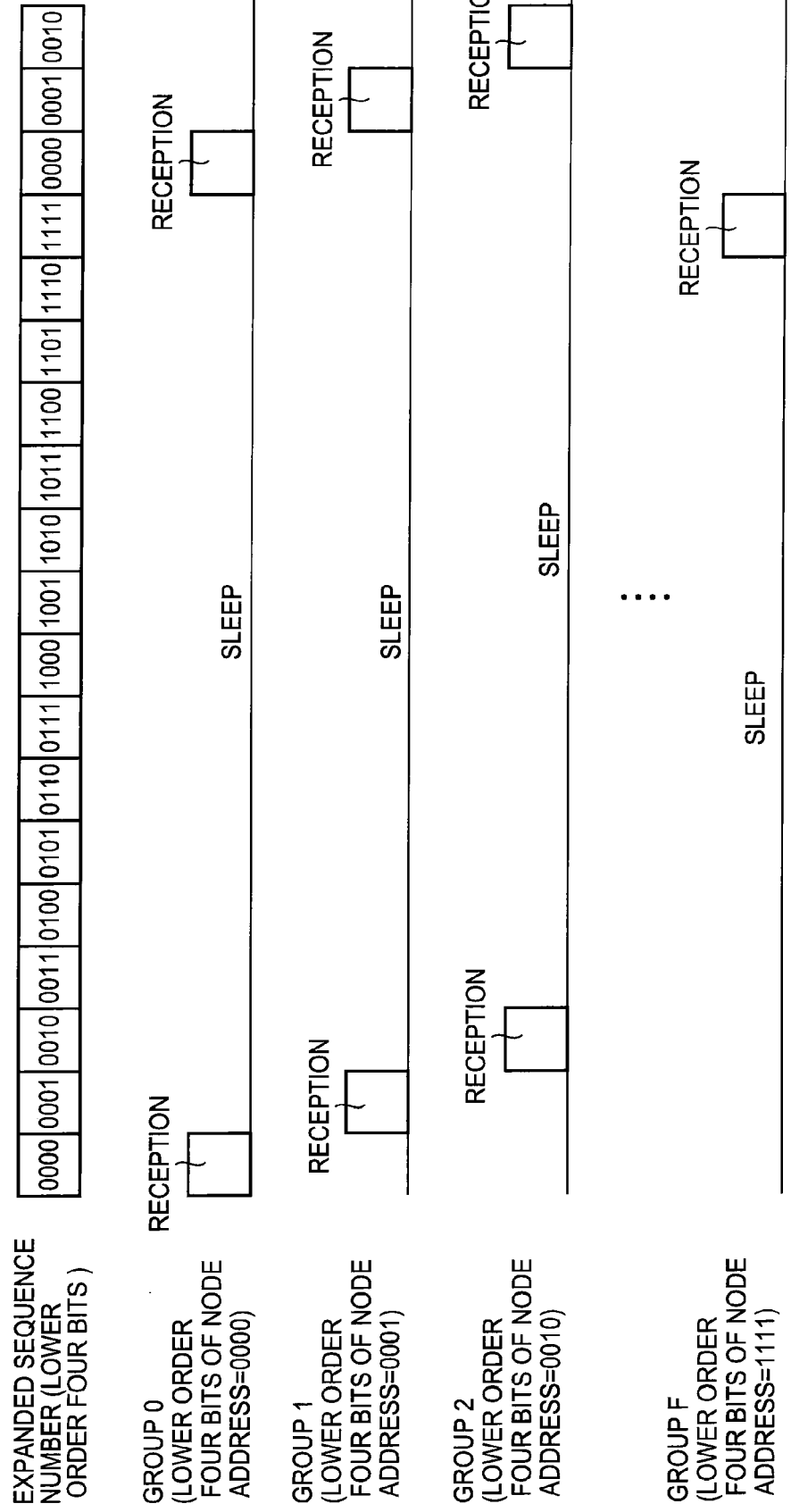
FIG. 10 shows an operation example of the radio terminal apparatus performing beacon reception processing in the first embodiment.

FIGS. 9 and 10 show operation examples of the radio terminal apparatus 2 performing beacon reception processing.

FIG. 9 shows an example of the case where the mask bit B24*b* is 3 (lower order two bits take value 1), and shows the lower order two bits of the expanded sequence number B24*a*. As shown in FIG. 9, the expanded sequence number B24*a* included in a beacon is incremented every transmission time of a beacon.

The plurality of radio terminal apparatuses 2 is classified into four groups on the basis of the node address of each of the radio terminal apparatuses 2 and the mask bits B24*b* included in beacons. For example, the plurality of radio terminal apparatuses 2 is classified into the ones in a group 0, each of which has the lower order two bits of the node address of "00," the ones in a group 1, each of which has the lower order two bits of the node address of "01," the ones in a group 2, each of which has the lower order two bits of the node address of "10," and the ones in a group 3, each of which has the lower order two bits of the node address of "11."

Each of the radio terminal apparatuses 2 belonging to the group 0 receives the beacon having the value "00" of the expanded sequence number B24*a* extracted on the basis of the mask bit B24*b*, and becomes in its sleep state during three beacon transmission intervals (period during which the beacons having the expanded sequence numbers B24*a* of 01, 10, and 11 are being transmitted). Similarly to the radio terminal apparatuses 2 belonging to the group 0, each of the radio terminal apparatuses belonging to each of the groups 1, 2, and 3 receives each of the beacons having the values of "01," "10," and "11," respectively, of the expanded sequence numbers B24*a* extracted on the basis of the mask bits B24*b*, and becomes in its sleep state for three beacon transmission intervals.

Consequently, the radio terminal apparatuses 2 do not need to receive all of the beacons periodically transmitted from the radio relay apparatus 1, and the radio terminal apparatuses 2 have only to receive the transmitted beacons once per four times.

FIG. 10 shows an example of the case where the mask bit B24*b* is F (each of the lower order four bits takes a value of 1), and shows the lower order four bits of the expanded sequence number B24*a*. As shown in FIG. 10, the expanded sequence number B24*a* included in a beacon is incremented every transmission time of a beacon.

The plurality of radio terminal apparatuses 2 is classified into sixteen groups on the basis of the node address of each of the radio terminal apparatuses 2 and the mask bits B24*b* included in beacons. For example, the plurality of radio terminal apparatuses 2 is classified into the ones in a group 0, each of which has the lower order four bits of the node address of "0000," the ones in a group 1, each of which has the lower order four bits of the node address of "0001," the ones in a group 2, each of which has the lower order four bits of the node address of "0010," . . . and the ones in a group F (15), each of which has the lower order four bits of the node address of "1111."

Each of the radio terminal apparatuses 2 belonging to the group 0 receives the beacon having the value "0000" of the expanded sequence number B24*a* extracted on the basis of the mask bit B24*b*, and becomes in its sleep state during fifteen beacon transmission intervals (period during which the beacons having the expanded sequence numbers B24*a* of 0001-1111 are being transmitted). Similarly to the radio terminal apparatuses 2 belonging to the group 0, each of the radio terminal apparatuses 2 belonging to each of the groups 1-F receives each of the beacons having the value of the expanded sequence number B24*a* extracted on the basis of the mask bit B24*b* which value agreeing with the value of the node address of the radio terminal apparatus 2, and becomes in its sleep state for fifteen beacon transmission intervals.

Consequently, the radio terminal apparatuses 2 do not need to receive all of the beacons periodically transmitted from the radio relay apparatus 1, and the radio terminal apparatuses 2 have only to receive the transmitted beacons once per sixteen times.

As described above, each of the radio terminal apparatuses 2 can calculate the timing when its radio reception section 27 is started by the use of the expanded sequence number B24*a* and the mask bit B24*b* as the group identification information and its node address, and becomes in its sleep state up to the calculated timing. Accordingly, the operation of the radio reception section 28 thereof can be stopped. Consequently, the unnecessary waiting reception of beacons can be eliminated, and the reduction of electric power consumption can be attained to enable the attainment of electric power saving.

Moreover, each of the radio terminal apparatuses 2 can judge the beacons addressed to the group to which the radio terminal apparatus 2 belongs on the basis of the expanded sequence numbers B24a, the mask bits B24b, and the node address thereof. If a beacon is addressed to the group to which the radio terminal apparatus 2 belongs and if the beacon includes the node address of the radio terminal apparatus 2, then the radio terminal apparatus 2 can receive the data.

Second Embodiment

Next, a second embodiment of the present invention will be described in detail. The second embodiment achieves the improvement of the efficiency of data transmission to radio terminal apparatuses and the electric power saving of the radio terminal apparatuses in a radio communication system including different types of radio terminal apparatuses. Incidentally, the present invention is not limited to the present embodiment. Moreover, the present embodiment of the invention is shown as a most preferable mode of the invention, and the terms of the invention are not limited to those shown in the present embodiment.

First, the configuration of the present embodiment will be described.

The schematic configuration diagram of the radio communication system A in the second embodiment is the same as that of the first embodiment shown in FIG. 1.

Furthermore, the schematic configuration diagram of the radio relay apparatus 1 is the same as that of the first embodiment shown in FIG. 2.

Figure 11:
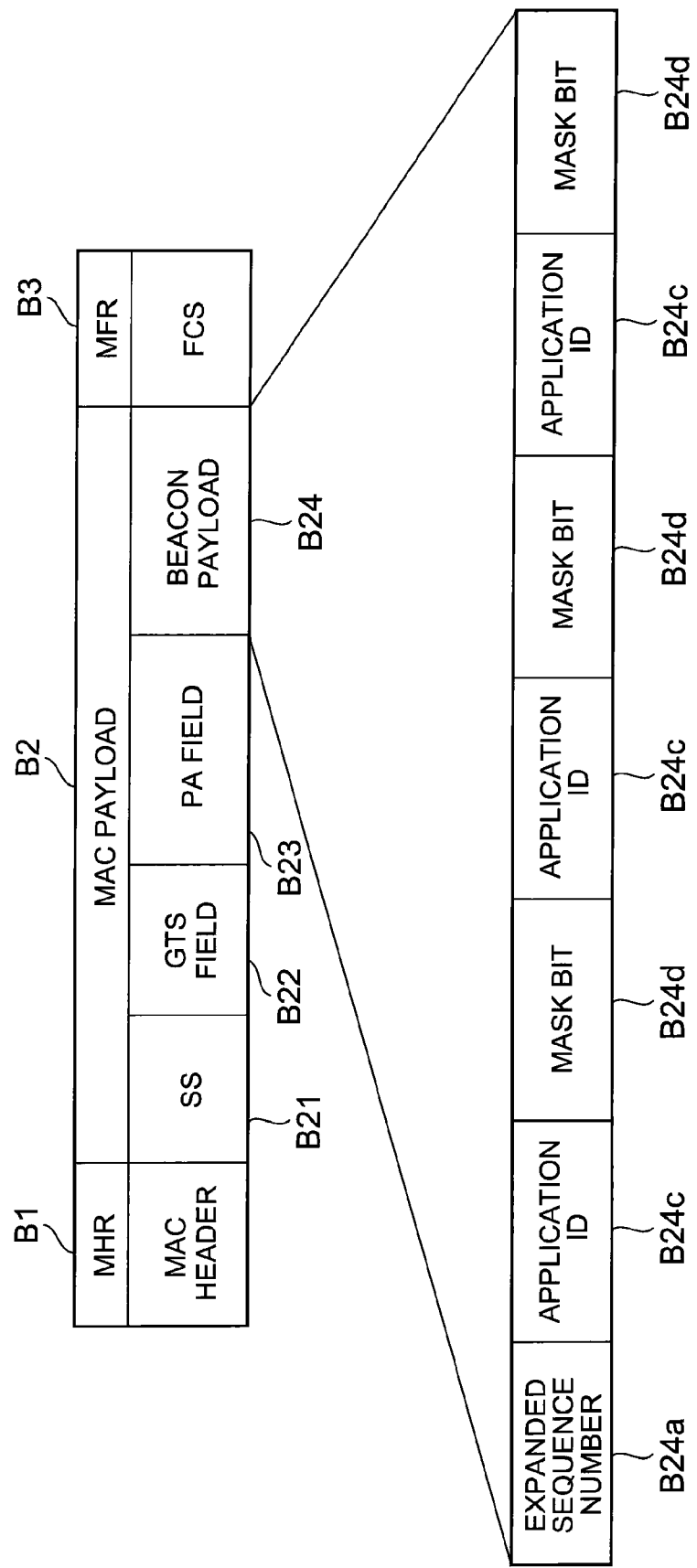
FIG. 11 shows an example of a beacon format in the second embodiment.

FIG. 11 shows an example of a beacon format in the present embodiment.

As shown in FIG. 11, a beacon includes a media access control (MAC) header region B1, a MAC payload region B2, and a MAC footer region (MFR) B3.

The MAC payload region B2 includes a superframe specification (SS) B21, a guaranteed time slot (GTS) field B22, a pending address (PA) field B23, a beacon payload B24, and the like.

The SS B21 is the detailed information field of a superframe, and a beacon transmission interval for performing the time management at the time of receiving a beacon and the communication system of a beacon are defined therein. In the GTS field B22, the information of the communication system (e.g. GTS) guaranteed to a specific radio terminal apparatus 2 is included. In the PA field B23, terminal identification information (node address) for identifying the radio terminal apparatus 2 to which data is transmitted if the data to be transmitted to the radio terminal apparatus 2 exists is included. The beacon payload B24 includes an expanded sequence number B24a and a plurality of combinations of application identification data (ID) B24c and mask bits B24d. The number of the combinations of application ID 324c and mask bits B24d is the number of types of the radio terminal apparatuses 2 connectable to the radio relay apparatus 1, and is not limited to the number shown in FIG. 11.

The value of the expanded sequence number B24a increases every transmission time of a beacon, and the expanded sequence number B24a functions as a sequence number.

The application ID B24c is preset terminal type information indicating the types of the radio terminal apparatuses 2. If there are three types of radio terminal apparatuses of first, second, and third radio terminal apparatuses 2a, 2b, and 2c as shown by the reference marks in parentheses in FIG. 1, then the application ID B24c is set to each type.

The mask bit B24d is set to each application ID B24c. Each of the mask bits B24d defines the value to be extracted out of the expanded sequence number B24a on the basis of the total number of classified groups of the plurality of radio terminal apparatuses 2 of the same type, and the mask bit B24d functions as mask information. Both the expanded sequence number B24a and each of the mask bits B24d function as the group identification information indicating the group to which the radio terminal apparatus 2 of the reception object of a beacon belongs in each type of the radio terminal apparatuses 2.

FIG. 12 shows an example of the combinations of the application ID B24c and the mask bits B24d corresponding to the types of the radio terminal apparatuses 2.

As shown in FIG. 12, the application ID B24c of the radio terminal apparatuses 2 for high speed responses is set to "40h," the application ID B24c of the radio terminal apparatuses 2 for middle speed responses is set to "80h," and the application ID B24c of the radio terminal apparatuses 2 for low speed responses is set to "C0h." The other application ID B24c is set to spares. Moreover, each of the mask bits B24b of the radio terminal apparatuses 2 for high speed responses is set to "0001h," each of the mask bits B24b of the radio terminal apparatuses 2 for middle speed responses is set to "000Fh," and each of the mask bits B24b of the radio terminal apparatuses 2 for low speed responses is set to "00FFh."

As the examples of the radio terminal apparatuses for high speed responses, there are sound terminals and the like, which are the radio terminal apparatuses 2 that receive beacons at the intervals shorter than those of the other types of radio terminal apparatuses 2 in order to realize their high speed response properties. As the examples of the radio terminal apparatuses for middle speed responses, there are electronic message boards and the like, which are the radio terminal apparatuses 2 that receive beacons at the intervals longer than those of the radio terminal apparatuses 2 for high speed responses and shorter than those of the radio terminal apparatuses 2 for low speed responses in order to realize their response properties slower than those of the radio terminal apparatuses 2 for high speed responses and faster than those of the radio terminal apparatuses 2 for low speed responses. As the examples of the radio terminal apparatuses for low speed responses, there are electronic bin tags and the like, which are the radio terminal apparatuses 2 that receive beacons at the intervals longer than those of the other types of the radio terminal apparatuses 2 in order to realize their low speed response properties.

In the present embodiment, the first radio terminal apparatuses 2a are used as those for high speed responses, the second radio terminal apparatuses 2b are used as those for middle speed responses, and the third radio terminal apparatuses 2c are used as those for low speed responses.

A beacon interval Tb is set by the radio relay apparatus 1 within a range from 15.36 [ms] to 251 [s] defined by the following formula (I) in the IEEE 802.15.4 standard.

$$Tb = 15.36 \text{ [ms]} \times 2^{SO} (0 \leq SO \leq 14) \tag{1}$$

If it is supposed that SO=2, the beacon interval Tb is 61.44 [ms].

For example, the reception intervals of beacons of the radio terminal apparatuses 2a for high speed responses are set to 122.88 [ms], the reception intervals of beacons of the radio terminal apparatuses 2b for middle speed responses are set to 983.04 [ms], and the reception intervals of beacons of the radio terminal apparatuses 2c for low speed responses are set to 1578.64 [ms].

The storage section 11 is a recording medium made of a magnetic or optical recording medium, or a nonvolatile memory made of a semiconductor or the like and capable of being electrically erased and rewritten. The storage section 11 is fixedly provided to the radio relay apparatus 1, or mounted thereon in a freely attachable and detachable state. For example, a ferroelectric random access memory (Fe RAM), a magneto resistive random access memory (M RAM), and an Ovonic unified memory (OUM: phase change recording memory using chalcogenide alloy) can be used for the storage section 11. Moreover, the storage section 11 previously stores various programs to be executed by the control section 10, various tables and data to be used by these programs, and the like.

The terminal information memory 12 is composed of a memory capable of being electrically erased and rewritten. The terminal information memory 12 stores the information such as the node addresses of the radio terminal apparatuses 2 existing in the region in which the radio relay apparatus 1 can communicate with the radio terminal apparatuses 2 for each type of the radio terminal apparatuses 2a, 2b and 2c, and the terminal information memory 12 functions as a terminal information storage section.

The beacon transmission timer 13 is a timer for timing the transmission intervals of beacons, and outputs a beacon transmission timing signal indicating that a timed time has reached a transmission interval to the control section 10.

The radio transmission section 14 includes a modulation circuit, a radio frequency (RF) circuit, and the like. The radio transmission section 14 adjusts the transmission power of packets, and performs the coding of the data to be transmitted in accordance with the instructions from the control section 10 to form the packets. The radio transmission section 14 modulates the formed packets to transmit the modulated packets to the radio terminal apparatuses 2 through the antenna 19.

The radio reception section 15 includes a demodulation circuit, an RF circuit, and the like. The radio reception section 15 adjusts the reception sensitivity of the packets and demodulates the packets received through the antenna 19. The radio reception section 15 outputs the data obtained by analyzing the demodulated packets to the control section 10.

The SW 16 is provided between the antenna 19 and the radio transmission section 14 or the radio reception section 15, and performs the switching between the transmission of a packet from the radio transmission section 14 and the reception of a packet from the antenna 19 in conformity with the instructions from the control section 10.

The wired I/F section 17 performs the communication control for performing the communication between the radio relay apparatus 1 and the other radio relay apparatuses 1 and external apparatuses connected to the radio relay apparatus 1 through the wired network 3 by a predetermined communication system.

The buffer 18 temporarily stores the data received through the wired I/F section 17.

The antenna 19 performs the transmission of packets according to set transmission power and the reception of packets according to set reception sensitivity.

The schematic configuration diagram of each of the radio terminal apparatuses 2 is the same as that of the first embodiment shown in FIG. 4.

In the second embodiment, the control section 20 executes beacon reception processing of calculating the timing of starting the radio reception section 27 (starting timing) on the basis of the expanded sequence number B24a, the application ID B24c, and the mask bits B24d, all included in the beacon received by the radio reception section 27, and the application ID B24c indicating the type of the radio terminal apparatus 2 and the node address for identifying the radio terminal apparatus 2 itself, which application ID B24c and the node address are stored in the memory 22, and of stopping the operation of the radio reception section 27 until the calculated starting timing.

As the calculation of the starting timing, the control section 20 first reads the application ID B24c indicating the type of the radio terminal apparatus 2 itself from the memory 22, and extracts the application ID B24c agreeing with the read application ID B24c from a beacon. Then, the control section 20 extracts the mask bit B24d corresponding to the application ID B24c from the beacon. Next, the control section 20 extract a first calculation value from the expanded sequence number B24a on the basis of the extracted mask bit B24d. Moreover, the control section 20 extracts a second calculation value from the own node address on the basis of the extracted mask bit B24d. Then, the control section 20 calculates the difference value between the first calculation value and the second calculation value, and calculates a third calculation value indicating a value obtained by multiplying the preset interval of transmitting beacons (beacon interval) by the difference value. Then, the control section 20 calculates a time obtained by adding the third calculation value to the time (T) of receiving a beacon as the starting timing.

Furthermore, the control section 20 judges whether a beacon received with the radio reception section 27 is addressed to the group to which the radio terminal apparatus 2 belongs or not on the basis of the expanded sequence number B24a, the mask bit B24d, and the node address.

Then, if the beacon received with the radio reception section 27 is the one addressed to the group to which the radio terminal apparatus 2 belongs, and if the PA field B23 of the beacon includes the node address of the radio terminal apparatus 2, then the control section 20 executes the processing of transmitting a data request to the radio relay apparatus 1 with the radio transmission section 26 and of receiving the data from the radio relay apparatus 1 with the radio reception section 27.

Figure 13:
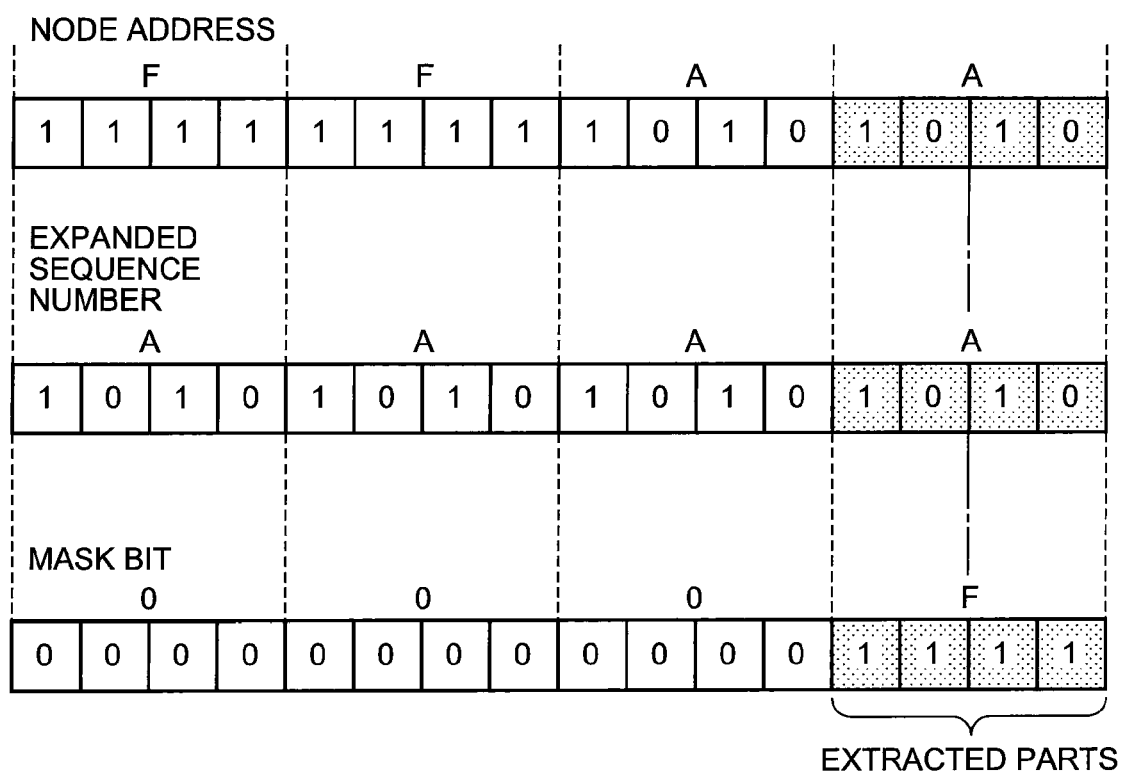
FIG. 13 shows an example of each of the expanded sequence number, the mask bit, and the node address in the second embodiment.

FIG. 13 shows an example of each of the expanded sequence number B24a, the mask bit B24d, and the node address. The calculation examples of the first calculation value and the second calculation value will be described with reference to FIG. 13.

As shown in FIG. 13, each of the expanded sequence number B24a, the mask bit B24d, and the node address is shown in two bytes (16 bits). With reference to FIG. 13, the description will be given to the example of the case where the expanded sequence number B24a is expressed as "AAAAh"; the mask bit B24d is expressed as "000Fh"; and the node address is expressed as "FFAAh." The values of the hexadecimal numbers corresponding to the values of the binary numbers are shown every four bits in FIG. 13.

The first calculation value is the one obtained by the logical operation of the "AND" of the expanded sequence number B24a and the mask bit B24d. In FIG. 13, the value "1010b" of the bits subjected to half-tone dot meshing of the expanded sequence number B24a corresponding to the bits of the values "1" of the mask bit B24d is calculated as the first calculation value. Moreover, the second calculation value is the one obtained by the logical operation of the "AND" of the node address and the mask bit B24d. In FIG. 13, the value "1010b" of the bits subjected to half-tone dot meshing of the node address corresponding to the bits of the values "1" of the mask bit B24d is calculated as the second calculation value.

If the lower order four bits of the mask bit B24d are "1," sixteen types of the first and second calculation values are extracted from the expanded sequence number B24a and the node address. Accordingly, the control section 20 identifies the plurality of radio terminal apparatuses 2 by classifying them into the groups composed of the radio terminal apparatuses 2 having the same lower order four bits of the node addresses on the basis of the mask bit B24d and the node address. For example, if the lower order four bits of the mask bit B24d are "1," then the plurality of radio terminal apparatuses 2 is classified into sixteen groups, each including the same type of the radio terminal apparatuses 2.

The value of each of the mask bits B24d (the digit number (number of bits) of bits of "1" of the mask bit B24d) is changed according to the number of the radio terminal apparatuses 2 of the same type, which radio terminal apparatuses 2 are connectable to the radio relay apparatus 1 to transmit beacons. The IEEE 802.15.4 standard defines that seven node addresses at a maximum are stored in one beacon, and accordingly the value of the mask bit B24d is defined in accordance with the number of the radio terminal apparatuses 2 per group calculated in accordance with the total number of the radio terminal apparatuses 2 and a multiple of "7."

If the calculated first calculation value and the second calculation value agree with each other, the control section 20 judges that the received beacon is the one addressed to the group to which the radio terminal apparatus 2 belongs among the groups of classifying the types of the radio terminal apparatuses 2.

The storage section 21 is composed of a magnetic or optical recording medium, or an electrically erasable and rewritable nonvolatile memory made of a semiconductor or the like, and is fixedly provided to the radio terminal apparatus 2 or is mounted thereon in the state of being freely attachable and detachable. For example, a ferroelectric random access memory (Fe RAM), a magneto resistive random access memory (M RAM), and an OUM (phase change recording memory made of chalcogenide alloy) can be given as the storage section 21. Moreover, the storage section 21 previously stores various programs to be executed by the control section 20, various tables and data to be used by these programs, and the like.

The memory 22 is composed of an electrically erasable and rewritable nonvolatile memory. The memory 22 stores the application ID B24c indicating the type of the radio terminal apparatus 2 itself, and the terminal identification information (node address) for the identification of the radio terminal apparatus 2 itself. The memory 22 functions as an identification information storage section.

The starting timer 23 is a timer for timing the starting timing (starting time) of the radio reception section 27 calculated by the control section 20, and outputs a starting timing signal indicating the fact of reaching the starting timing to the control section 20.

The power source control section 24 controls the power source of the whole radio terminal apparatus 2 in conformity with an instruction from the control section 20 to supply electric power from the battery B to each section of the radio terminal apparatus 2.

The battery B is, for example, a primary battery, such as an alkaline battery and a manganese battery, a secondary battery, such as a nickel cadmium battery, a nickel hydrogen battery, and a lithium ion battery, and the like.

The display control section 25a makes the display section 25b display various kinds of information in conformity with the display instructions input from the control section 20.

The display section 25b is composed of a liquid crystal display (LCD), an electro luminescence (EL) display, or the like, and displays various screens on the display according to the signals input from the display control section 25a.

The radio transmission section 26 includes a modulation circuit, a radio frequency (RF) circuit, and the like. The radio transmission section 26 adjusts the transmission power of a packet, and forms a packet by coding the data to be transmitted in conformity with the instruction from the control section 20. The radio transmission section 26 modulates the formed packet, and transmits the packet to the radio relay apparatus 1 through the antenna 29.

The radio reception section 27 includes a demodulation circuit, an RF circuit, and the like. The radio reception section 27 adjusts the reception sensitivity of a packet, and demodulates the packet received through the antenna 29. The radio reception section 27 outputs the data obtained by analyzing the demodulated packet to the control section 20.

The SW 28 is provided between the antenna 29 and the radio transmission section 26 or the radio reception section 27, and performs the switching between the transmission of a packet from the radio transmission section 26 and the reception of a packet from the antenna 29 in conformity with an instruction from the control section 20.

The antenna 29 transmits a packet according to set transmission power and receives a packet according to set reception sensitivity.

Next, the operation of the present embodiment will be described with reference to FIGS. 14-16.

Figure 14:
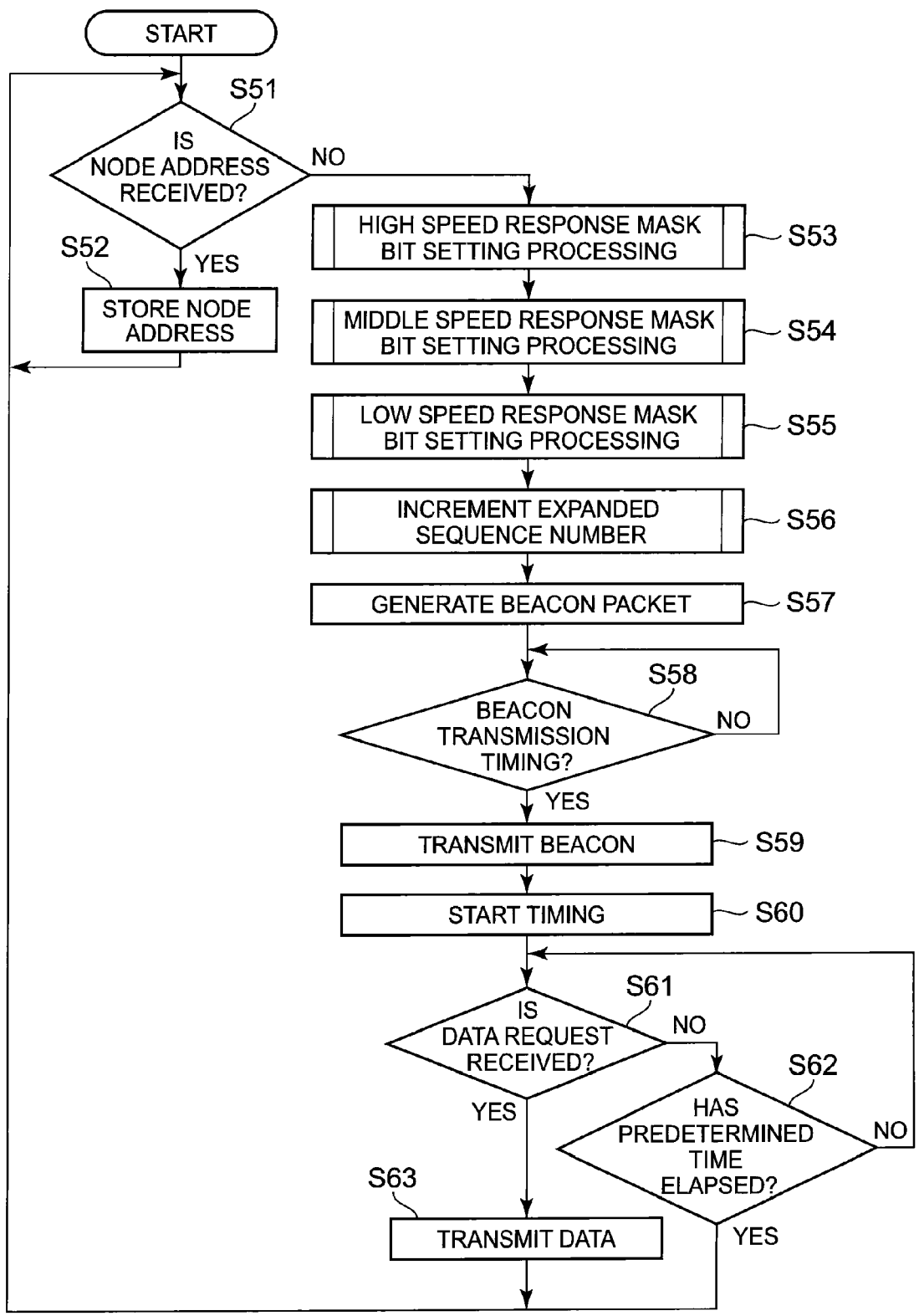
FIG. 14 shows the main flowchart of the beacon transmission processing in the second embodiment.

FIG. 14 shows the main flowchart of the beacon transmission processing executed by the radio relay apparatus 1. Incidentally, the processing shown in FIG. 14 is executed in cooperation with the control section 10 and each section in the radio relay apparatus 1, and the processing is executed during the supply of electric power to the radio relay apparatus 1.

First, the control section 10 judges whether a packet including a node address is received from a radio terminal apparatus 2 through the radio reception section 15 or not (Step S51). If the packet including the node address is received (Step S51: YES), then the control section 10 stores the node address included in the received packet into the terminal information memory 12 (Step S52), and returns the processing to that at Step S51.

If no packets including node addresses are received (Step S51: NO), then the control section 10 executes high speed response mask bit setting processing (Step S53), middle speed response mask bit setting processing (Step S54), and low speed response mask bit setting processing (Step S55).

After the setting of the mask bits B24d to each type of the radio terminal apparatuses 2a, 2b, and 2c (after the processing at Steps S53-S55), the control section 10 increments the expanded sequence number B24a (Step S56). The controls section 10 generates a beacon packet including the application ID B24c indicating the type of each of the radio terminal apparatuses 2a, 2b, and 2c, the mask bit B24d set to the application ID B24c, and the expanded sequence number B24a (Step S57).

The control section 10 judges whether a beacon transmission timing signal has been input from the beacon transmission timer 13 or not (Step S58). If the beacon transmission timing signal has not been input (Step S58: NO), the control section 10 returns the processing to that at Step S58.

If the beacon transmission timing signal has been input (Step S58: YES), the control section 10 makes the radio transmission section 14 transmit the generated beacon through the antenna 19 (Step S59), and clears the beacon transmission timer 13 to start the timing of a beacon transmission interval (Step S60).

The control section 10 judges whether a data request has been received from a radio terminal apparatus 2 through the radio reception section 15 or not (Step S61).

If no data requests are received (Step S61: NO), the control section 10 judges whether a preset time (predetermined time) has elapsed from the timing by the beacon transmission timer or not (Step S62). If the predetermined time has not elapsed (Step S62: NO), the control section 10 returns the processing to that at Step S61. If the predetermined time has elapsed (Step S62: YES), the control section 10 returns the processing to that at Step S51.

If a data request is received (Step S61: YES), then the control section 10 generates the data addressed to the radio terminal apparatus 2 that has transmitted the data request, and transmits the generated data to the radio terminal apparatus 2 (Step S63). Then, the control section 10 returns the processing to that at Step S51.

As described above, the radio relay apparatus 1 determines the mask bit B24*d* indicating the total number of the groups to which the radio terminal apparatuses 2*a*, 2*b*, and 2*c* belong for each type of the radio terminal apparatuses 2*a*, 2*b*, and 2*c* according to the number of the radio terminal apparatuses 2*a*, 2*b*, and 2*c* that can perform communication in each type of the radio terminal apparatuses 2*a*, 2*b*, and 2*c*, and the radio relay apparatus 1 can periodically transmit the beacons including the mask bit B24*d* in each type of the radio terminal apparatus 2*a*, 2*b*, 2*c* (i.e. combinations of the application ID B24*c* and the mask bits B24*d*) and the expanded sequence number B24*a* to the radio terminal apparatuses 2*a*, 2*b*, and 2*c*.

Figure 15:
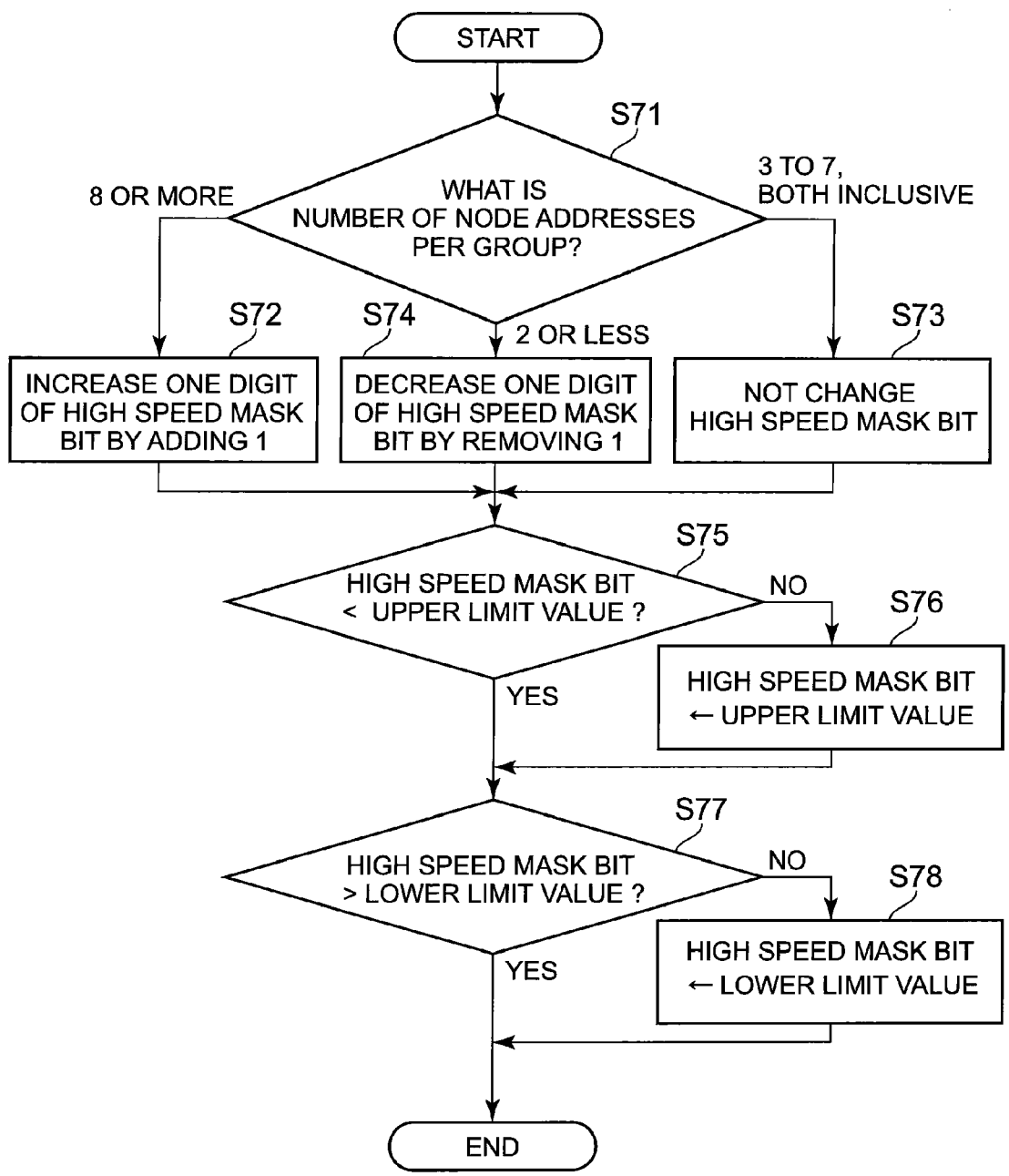
FIG. 15 shows a flow chart of high speed response mask bit setting processing in the second embodiment.

FIG. 15 shows a flow chart of the high speed response mask bit setting processing.

The control section 10 calculates the total number of the node addresses of the radio terminal apparatuses 2*a* for high speed responses stored in the terminal information memory 12. Moreover, the control section 10 calculates the total number of the groups classified on the basis of the value of the mask bit B24*d* of the radio terminal apparatus 2*a* for a high speed response (hereinafter also referred to as a high speed mask bit) set as an initial value. The control section 10 calculates the number of the node addresses per group on the basis of the total number of the node addresses of the radio terminal apparatuses 2*a* for high speed responses and the total number of the groups. Then, the control section 10 judges the number of the node addresses per group (Step S71).

If the number of the node addresses per group is eight or more (Step S71: 8 or more), then the control section 10 increases the number of the digits, each having 1, of the high speed mask bit B24*d* by one digit (Step S72). At Step S72, for example, if the lower order two bits of the high speed mask bit B24*d* are 1 at Step S71, then the lower order three bits thereof are 1 at Step S72, and the number of the groups of the radio terminal apparatuses 2*a* for high speed responses is increased.

If the number of the node addresses per group is within a range from three to seven, both inclusive, (Step S71: 3 to 7, both inclusive), then the control section 10 does not change the high speed mask bit B24*d* (Step S73). At Step S73, for example, if the lower order two bits of the high speed mask bit B24*d* are 1 at Step S71, the lower order two bits are 1 also at Step S73, and the number of the groups of the radio terminal apparatuses 2*a* for high speed responses does not change.

If the number of the node addresses per group is two or less (Step S71: 2 or less), then the control section 10 decreases the number of the digits, each having 1, of the high speed mask bit B24*d* by one digit (Step S74). At Step S74, for example, if the lower order two bits of the high speed mask bit B24*d* are 1 at Step S71, the lower order one bit becomes 1 at Step S74, and the number of the groups of the radio terminal apparatuses 2*a* for high speed responses is decreased.

By decreasing the number of the groups by decreasing the number of digits, each having 1, of the high speed mask bit B24*d* by one digit at Step S74, the reception interval of beacons can be shortened, and the responsibility of the radio terminal apparatuses 2*a* for high speed responses can be heightened within a previously permitted range (within a range from a preset upper limit value to a preset lower limit value).

After any of the processing at Steps S72, S73, and S74, the control section 10 judges whether the high speed mask bit B24*d* is smaller than the preset upper limit value or not (Step S75). If the high speed mask bit B24*d* is equal to or more than the upper limit value (Step S75: NO), then the control section 10 sets the high speed mask bit B24*d* to the upper limit value (Step S76).

If the high speed mask bit B24*d* is smaller than the upper limit value (Step S75: YES), or after the processing at Step S76, the control section 10 judges whether the high speed mask bit B24*d* is larger than the preset lower limit value or not (Step S77). If the high speed mask bit B24*d* is larger than the lower limit value (Step S77: YES), then the control section 10 ends the high speed response mask bit setting processing.

If the high speed mask bit B24*d* is equal to or less than the lower limit value (Step S77: NO), the control section 10 sets the high speed mask bit B24*d* to the lower limit value (Step S78), and ends the high speed response mask bit setting processing.

If the high speed mask bit B24*d* becomes unlimitedly larger, there is the possibility that the number of groups increases to make it impossible to keep the high speed responsibility. Accordingly, at Step S76, the high speed mask bit B24*d* is set to be the preset upper limit value or less to secure the high speed responsibility.

Figure 16:
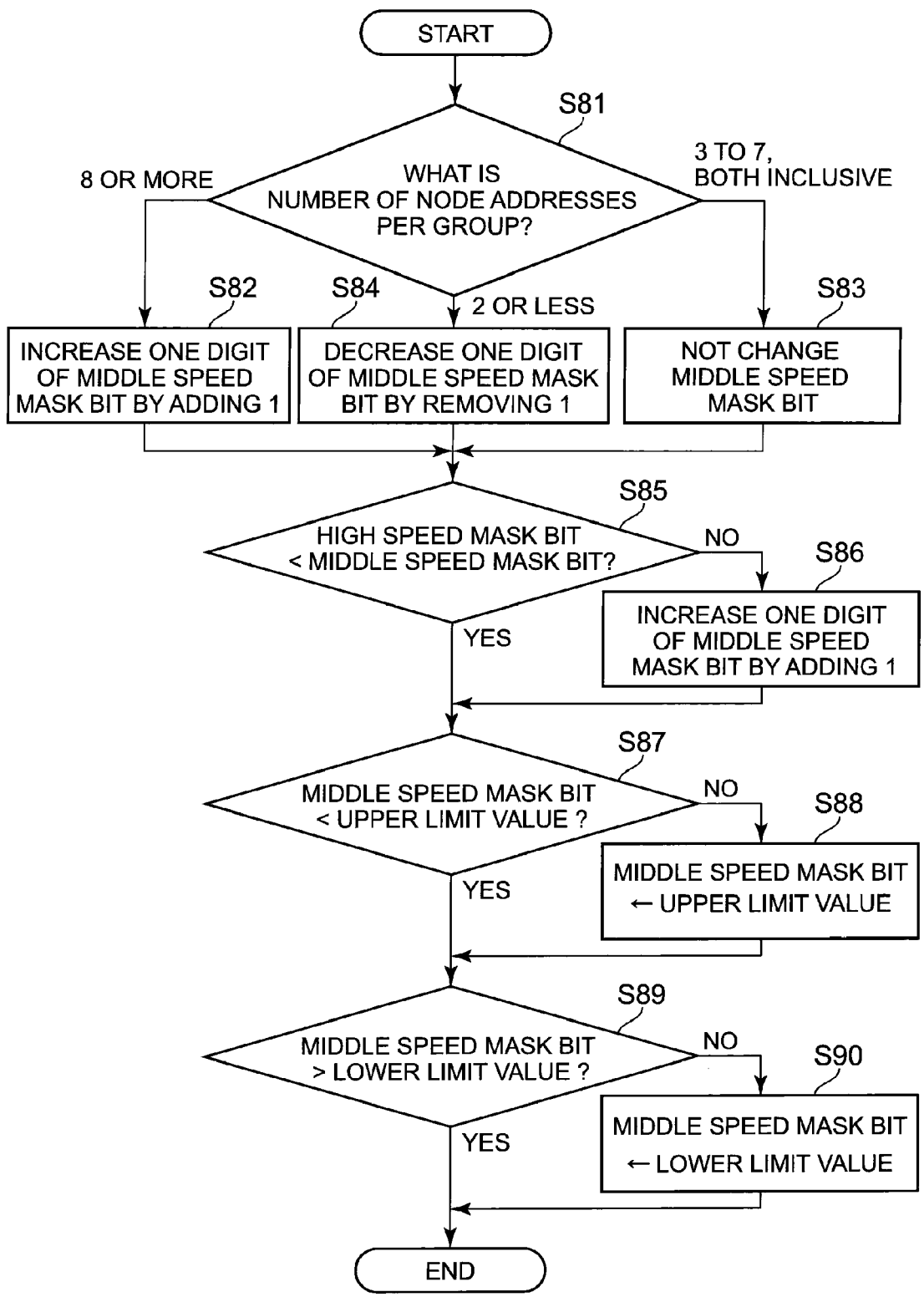
FIG. 16 shows a flow chart of middle speed response mask bit setting processing in the second embodiment.

FIG. 16 shows a flow chart of the middle speed response mask bit setting processing.

The control section 10 calculates the total number of the node addresses of the radio terminal apparatuses 2*b* for middle speed responses stored in the terminal information memory 12. Moreover, the control section 10 calculates the total number of the groups classified on the basis of the value of the mask bit B24*d* of the radio terminal apparatus 2*b* for a middle speed response (hereinafter also referred to as a middle speed mask bit) set as an initial value. The control section 10 calculates the number of the node addresses per group on the basis of the total number of the node addresses of the radio terminal apparatuses 2*b* for middle speed responses and the total number of the groups. Then, the control section 10 judges the number of the node addresses per group (Step S81).

If the number of the node addresses per group is eight or more (Step S81: 8 or more), then the control section 10 increases the number of the digits, each having 1, of the middle speed mask bit B24*d* by one digit (Step S82). At Step S82, for example, if the lower order four bits of the middle speed mask bit B24*d* are 1 at Step S81, then the lower order five bits thereof are 1 at Step S82, and the number of the groups of the radio terminal apparatuses 2*b* for middle speed responses is increased.

If the number of the node addresses per group is within a range from three to seven, both inclusive, (Step S81: 3 to 7, both inclusive), then the control section 10 does not change the middle speed mask bit B24*d* (Step S83). At Step S83, for example, if the lower order four bits of the middle speed mask bit B24*d* are 1 at Step S81, the lower order four bits are 1 also at Step S83, and the number of the groups of the radio terminal apparatuses 2*b* for middle speed responses does not change.

If the number of the node addresses per group is two or less (Step S81: 2 or less), then the control section 10 decreases the number of the digits, each having 1, of the middle speed mask bit B24*d* by one digit (Step S84). At Step S84, for example, if the lower order four bits of the middle speed mask bit B24*d* are 1 at Step S81, the lower order three bits severally become 1 at Step S84, and the number of the groups of the radio terminal apparatuses 2*b* for middle speed responses is decreased.

By decreasing the number of the groups by decreasing the number of digits, each having 1, of the middle speed mask bit B24*d* by one digit at Step S84, the reception interval of beacons can be shortened, and the responsibility of the radio terminal apparatuses 2*b* for middle speed responses can be heightened within the previously permitted range (within the range from the preset upper limit value to the preset lower limit value).

After any of the processing at Steps S82, S83, and S84, the control section 10 judges whether the high speed mask bit B24*d* is smaller than the middle speed mask bit B24*d* or not (Step S85). If the high speed mask bit B24*d* is equal to or more than the middle speed mask bit B24*d* (Step S85: NO), then the control section 10 increases the number of the digits, each having 1, of the middle speed mask bit B24*d* by one digit (Step S86).

The processing at Step S86 is for preventing the radio terminal apparatuses 2*b* for middle speed responses from receiving beacons at a period shorter than that of the radio terminal apparatuses 2*a* for high speed responses by decreasing the number of the groups of the radio terminal apparatuses 2*b* for middle speed responses to be less than that of the groups of the radio terminal apparatuses 2*a* for high speed responses.

If the high speed mask bit B24*d* is smaller than the middle speed mask bit B24*d* (Step S85: YES), or after the processing at Step S86, the control section 10 judges whether the middle speed mask bit B24*d* is smaller than a preset upper limit value or not (Step S87). If the middle speed mask bit B24*d* is equal to or more than the upper limit value (Step S87: NO), then the control section 10 sets the middle speed mask bit B24*d* to the upper limit value (Step S88).

If the middle speed mask bit B24*d* becomes unlimitedly larger, there is the possibility that the number of groups increases to make it impossible to keep the set responsibility of the radio terminal apparatus 2*b*. Accordingly, at Step S88, the middle speed mask bit B24*d* is set to be the preset upper limit value or less to secure the responsibility.

If the middle speed mask bit B24*d* is smaller than the upper limit value (Step S87: YES), or after the processing at Step S88, the control section 10 judges whether the middle speed mask bit B24*d* is larger than a preset lower limit value or not (Step S89). If the middle speed mask bit B24*d* is larger than the lower limit value (Step S89: YES), then the control section 10 ends the middle speed response mask bit setting processing.

If the middle speed mask bit B24*d* is equal to or less than the lower limit value (Step S89: NO), then the control section 10 sets the middle speed mask bit B24*d* to the lower limit value (Step S90), and ends the middle speed response mask bit setting processing.

If the middle speed mask bit B24*d* becomes unlimitedly smaller, the number of groups decreases to make the radio terminal apparatus 2*b* perform reception frequently. Consequently, the electric power consumption of the radio terminal apparatus 2*b* increases. Accordingly, at Step S90, the middle speed mask bit B24*d* is set to be the preset lower limit value or more to prevent the electric power consumption from increasing.

Figure 17:
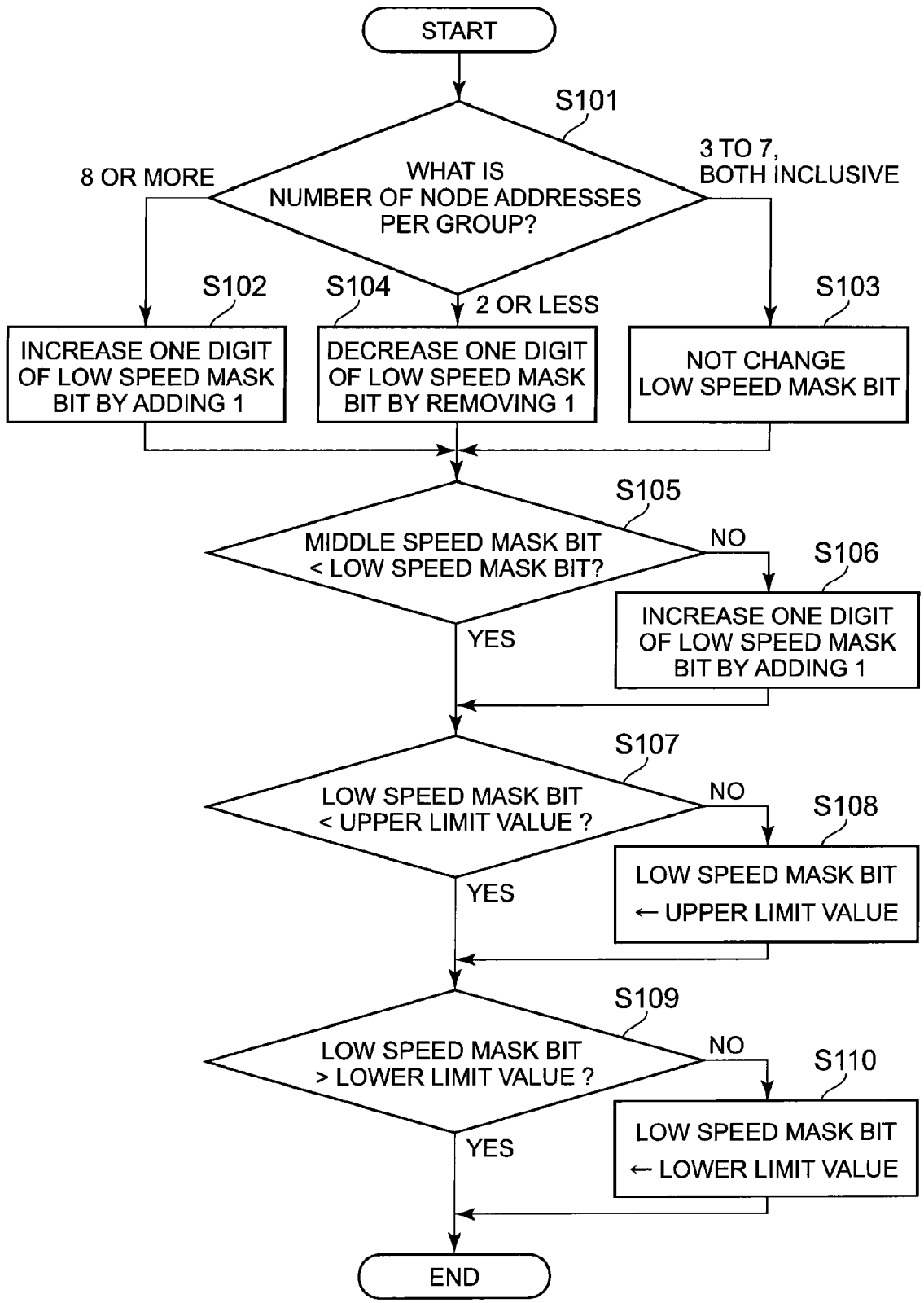
FIG. 17 shows a flowchart of low speed response mask bit setting processing in the second embodiment.

FIG. 17 shows a flow chart of the low speed response mask bit setting processing.

The control section 10 calculates the total number of the node addresses of the radio terminal apparatuses 2*c* for low speed responses stored in the terminal information memory 12. Moreover, the control section 10 calculates the total number of the groups classified on the basis of the value of the mask bit B24*d* of the radio terminal apparatus 2*c* for a low speed response (hereinafter also referred to as a low speed mask bit) set as an initial value. The control section 10 calculates the number of the node addresses per group on the basis of the total number of the node addresses of the radio terminal apparatuses 2*c* for low speed responses and the total number of the groups. Then, the control section 10 judges the number of the node addresses per group (Step S101).

If the number of the node addresses per group is eight or more (Step S101: 8 or more), then the control section 10 increases the number of the digits, each having 1, of the low speed mask bit B24*d* by one digit (Step S102). At Step S102, for example, if the lower order eight bits of the low speed mask bit B24*d* are severally 1 at Step S101, then the lower order nine bits thereof are severally 1 at Step S102, and the number of the groups of the radio terminal apparatuses 2*c* for low speed responses is increased.

If the number of the node addresses per group is within a range from three to seven, both inclusive, (Step S101: 3 to 7, both inclusive), then the control section 10 does not change the low speed mask bit B24*d* (Step S103). At Step S103, for example, if the lower order eight bits of the low speed mask bit B24*d* are 1 at Step S101, the lower order eight bits are 1 also at Step S103, and the number of the groups of the radio terminal apparatuses 2*c* for low speed responses does not change.

If the number of the node addresses per group is two or less (Step S101: 2 or less), then the control section 10 decreases the number of the digits, each having 1, of the low speed mask bit B24*d* by one digit (Step S104). At Step S104, for example, if the lower order eight bits of the low speed mask bit B24*d* are severally 1 at Step S101, the lower order seven bits severally become 1 at Step S104, and the number of the groups of the radio terminal apparatuses 2*c* for low speed responses is decreased.

By decreasing the number of the groups by decreasing the number of digits, each having 1, of the low speed mask bit B24*d* by one digit at Step S104, the reception interval of beacons can be shortened, and the responsibility of the radio terminal apparatuses 2*c* for low speed responses can be heightened within a previously permitted range (within a range from a preset upper limit value to a preset lower limit value).

After any of the processing at Steps S102, S103, and S104, the control section 10 judges whether the middle speed mask bit B24*d* is smaller than the low speed mask bit B24*d* or not (Step S105). If the middle speed mask bit B24*d* is equal to or more than the low speed mask bit B24*d* (Step S105: NO), then the control section 10 increases the number of the digits, each having 1, of the low speed mask bit B24*d* by one digit (Step S106).

The processing at Step S106 is for preventing the radio terminal apparatuses 2*c* for low speed responses from receiving beacons at a period shorter than that of the radio terminal apparatuses 2b for middle speed responses by decreasing the number of the groups of the radio terminal apparatuses 2c for low speed responses to be less than that of the groups of the radio terminal apparatuses 2b for middle speed responses.

If the middle speed mask bit B24d is smaller than the low speed mask bit B24d (Step S105: YES) or after the processing at Step S106, the control section 10 judges whether the low speed mask bit B24d is smaller than the preset upper limit value or not (Step S107). If the low speed mask bit B24d is equal to or more than the upper limit value (Step S107: NO), then the control section 10 sets the low speed mask bit B24d to the upper limit value (Step S108).

If the low speed mask bit B24d becomes unlimitedly larger, there is the possibility that the number of groups increases to make it impossible to keep the set responsibility of the radio terminal apparatus 2c. Accordingly, at Step S108, the low speed mask bit B24d is set to be the preset upper limit value or less to secure the responsibility.

If the low speed mask bit B24d is smaller than the upper limit value (Step S107: YES), or after the processing at Step S108, the control section 10 judges whether the low speed mask bit B24d is larger than the preset lower limit value or not (Step S109). If the low speed mask bit B24d is larger than the lower limit value (Step S109: YES), then the control section 10 ends the low speed response mask bit setting processing.

If the low speed mask bit B24d is equal to or less than the lower limit value (Step S109: NO), then the control section 10 sets the low speed mask bit B24d to the lower limit value (Step S110), and ends the low speed response mask bit setting processing.

If the low speed mask bit B24d becomes unlimitedly smaller, the number of groups decreases to make the radio terminal apparatus 2c perform reception frequently. Consequently, the electric power consumption of the radio terminal apparatus 2c increases. Accordingly, at Step S110, the low speed mask bit B24d is set to be the preset lower limit value or more to prevent the electric power consumption from increasing.

As described above, because the radio relay apparatus 1 can transmit beacons, each including the application ID B24c and the mask bit B24d of each of the plurality of types of radio terminal apparatuses 2a, 2b, and 2c, which receive the beacons at the intervals different from one another, and the expanded sequence number B24a, it is possible to achieve the improvement of the efficiency of data transmission to the radio terminal apparatuses 2a, 2b, and 2c. Furthermore, because the radio relay apparatus 1 can determine the mask bit B24d indicating the total number of the groups to which the radio terminal apparatuses 2a, 2b, and 2c belong according to the number of the radio terminal apparatuses 2a, 2b, and 2c by the type of the radio terminal apparatuses 2a, 2b, and 2c, the transmission frequency of the beacons can be changed according to the types of the radio terminal apparatuses 2a, 2b, and 2c, and the improvement of the efficiency of the data transmission can be achieved.

Figure 18:
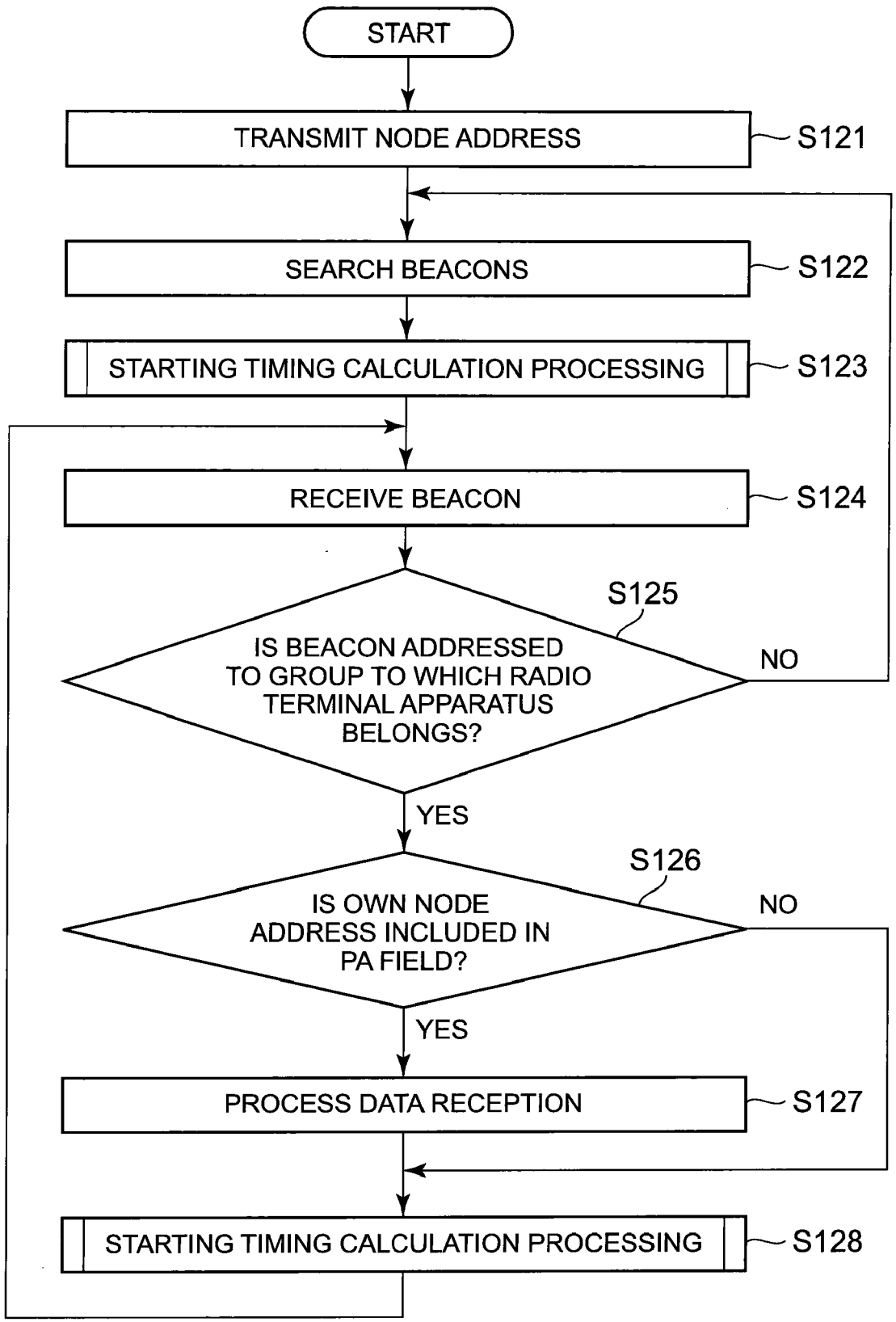
FIG. 18 shows a flow chart of beacon reception processing in the second embodiment.

FIG. 18 shows a flow chart of beacon reception processing executed in each of the radio terminal apparatuses 2. Incidentally, the processing shown in FIG. 18 is executed in cooperation with the control section 20 and each section in the radio terminal apparatuses 2 and is executed during electric power is supplied to the radio terminal apparatuses 2.

The control section 20 generates a packet including its own node address stored in the memory 22, and transmits the generated packet to the radio relay apparatus 1 through the radio transmission section 26 (Step S121).

The control section 20 searches for beacons (beacon search) periodically transmitted from the radio relay apparatus 1 in order to secure the radio circuit with the radio relay apparatus 1 (Step S122). When the radio circuit with the radio relay apparatus 1 is secured after the end of the beacon search, the control section 20 executes starting timing calculation processing, which will be described later (Step S123).

When the control section 20 receives a beacon with the radio reception section 27 (Step S124), the control section 20 judges whether the received beacon is addressed to the group to which the control section 20 itself belongs or not on the basis of the analysis result of the beacon by the radio reception section (Step S125).

At Step S125, the control section 20 extracts the expanded sequence number B24a, the application ID B24c agreeing with the own application ID B24c stored in the memory 22, and the mask bit B24d corresponding to the application ID B24c from the received beacon. Then, the control section 20 judges whether the first calculation value calculated on the basis of the extracted expanded sequence number B24a and the mask bit B24d agrees with the second calculation value calculated on the basis of its own node address and the mask bit B24d or not. If the first calculation value agrees with the second calculation value, then the control section 20 judges that the received beacon is the one addressed to the group to which the radio terminal apparatus 2 belongs.

If the received beacon is not the one addressed to the group to which the radio terminal apparatus 2 does not belong (Step S125: NO), the control section 20 returns the processing to that at Step S122.

If the received beacon is the one addressed to the group to which the radio terminal apparatus 2 belongs (Step S125: YES), then the control section 20 judges whether its own node address is included in the PA field 323 of the received beacon or not (Step S126).

If the own node address is not included in the PA field B23 of the received beacon (Step S126: NO), then the control section 20 advances the processing to that at Step S128.

If the own node address is included in the PA field B23 of the received beacon (Step S126: YES), then the control section 20 executes data reception processing (Step S127). The data reception processing Step S127 is the processing of transmitting a data request packet indicating a transmission request of data to the radio relay apparatus 1 and of receiving the packet of the data to be transmitted from the radio relay apparatus 1 in response to the packet.

The control section 10 executes the starting timing calculation processing after the decision of NO at Step S126 or after the processing at Step S127 (Step S128), and returns the processing to that at Step S124.

FIG. 19 shows a flow chart of the starting timing calculation processing. Incidentally, the processing shown in FIG. 19 is executed in cooperation with the control section 20 and each section in the radio terminal apparatus 2.

The control section 20 sets the time when the radio terminal apparatus 2 has received a beacon from the radio relay apparatus 1 to T (Step S131), and sets the beacon transmission interval included in the received beacon to SFI (Step S132). Moreover, the control section 20 sets the expanded sequence number B24a included in the beacon payload B24 of the received beacon to SCN (Step S133).

The control section 20 sets the mask bit B24b corresponding to the application ID B24c agreeing with its own application ID B24c stored in the memory 22 among the application ID B24c included in the received beacons to M (Step S134). Furthermore, the control section 20 sets its own node address to ADDR (Step S135).

The control section 20 sets the value of the AND of the SCN and the M to SCN, and sets the value of the AND of the ADDR and the M to ADDR (Step S136). The SCN set by the processing at Step S136 corresponds to the first calculation value, and the ADDR corresponds to the second calculation value.

The control section 20 judges whether the ADDR is larger than the SCN (Step S137). If the ADDR is equal to or less than the SCN (Step S137: NO), then the control section 20 adds the ADDR to the value obtained by adding 1 to M, and sets a new ADDR (Step S138). For example, if the M is "11b" and the ADDR is "10b" at Step S138, then, if 1 is added to the M, the M becomes "100b." Then, "110b" obtained by adding the value "10b" of the ADDR to "100b" is set to the new ADDR.

If the ADDR is larger than the SCN (Step S137: YES), or after Step S138, the control section 20 set a value (difference value) obtained by subtracting the SCN from the ADDR to NSFI (Step S139). The NSFI is the number of the beacon transmission intervals from the reception of a beacon to the reception of the next beacon. For example, if the ADDR is "10b" and the SCN is "00b," then the NSFI is "10b." In this case, if the NSFI is expressed by a decimal number, then the NSFI is expressed as "2." Consequently, the number of the beacon transmission intervals from the reception of a beacon to the reception of the next beacon, i.e. the NSFI, is set to "2."

The control section 20 adds the T to the value (third calculation value) obtained by multiplying the NSFI by the SFI and subtracting a preset float a from the product to calculate starting timing (starting time) (Step S140). The control section 20 sets the calculated starting timing into the starting timer 23 (Step S141), and starts timing by the starting timer 23. The control section 20 sets the power supply to each section, such as the radio transmission section 26 and the radio reception section 27, to a minimum, and stops the operations of the radio transmission section 26, the radio reception section 27, and the like to make the radio terminal apparatus 2 in its sleep state (Step S142).

The control section 20 judges whether it is a starting time or not by judging whether a starting timing signal has been input from the starting timer 23 or not (Step S143). If the time is not a starting time (Step S143: NO), the control section 20 returns the processing to that at Step S143.

If the time is a starting time (Step S143: YES), the control section 20 clears the starting timer 23, and starts each section, which is in each sleep state (Step S144). Then, the control section 20 ends the starting timing calculation processing.

As described above, the plurality of the radio terminal apparatuses 2 having different intervals for receiving beacons can receive the same beacons, and the improvement of the efficiency of data reception from the radio relay apparatus 1 can be achieved. Moreover, because the operation of the radio reception section 27 can be stopped until the timing calculated on the basis of the application ID B24c, the mask bit B24d, and the expanded sequence number B24a, which are included in the received beacon, and the application ID B24c and the node address of the radio terminal apparatus 2, the improvement of the efficiency of data reception can be achieved, and the electric power saving of the radio terminal apparatus 2 can be achieved.

Moreover, each of the radio terminal apparatuses 2 can judge the beacons addressed to the group to which the radio terminal apparatus 2 belongs and is the type of its own on the basis of the application ID B24c, the mask bit B24d, and the expanded sequence number B24a, which are included in a received beacon, and its own application ID B24c and node address. Moreover, if a beacon is addressed to the group to which the radio terminal apparatus 2 belongs and is the type of its own, and if the beacon includes its own node address, the radio terminal apparatus 2 can receive the data.

Furthermore, the radio terminal apparatus can calculate the timing when its radio reception section 27 is started by the use of the expanded sequence number B24a included in the received beacon, the mask bit B24d and the node address of the type of the radio terminal apparatus 2, and becomes in its sleep state up to the calculated timing. Accordingly, the operation of the radio reception section 28 thereof can be stopped. Consequently, the unnecessary waiting reception of beacons can be eliminated, and the reduction of electric power consumption can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio terminal apparatus of a radio communication system which includes the radio terminal apparatus and a radio relay apparatus that periodically transmits a beacon, wherein the radio terminal apparatus includes a reception section which receives the beacon to perform data transmission/reception when an own address of the radio terminal apparatus exists in the beacon, the radio terminal apparatus comprising:

an identification information storage section which stores terminal identification information for identifying the radio terminal apparatus; and a control section which calculates a timing of starting the reception section based on group identification information included in the beacon received by the reception section and the stored terminal identification information, and which causes an operation of the reception section to be stopped until the calculated timing, wherein the group identification information indicates whether or not the received beacon is addressed to a group to which the radio terminal apparatus belongs, and wherein the group identification information includes:

a sequence number which is a value that increases every transmission time of the beacon, and mask information which defines a value of the sequence number to be extracted based on a total number of classified groups of a plurality of the radio terminal apparatuses, and wherein the control section: (i) calculates a difference value between a first calculation value indicating the extracted value of the sequence number using the mask information and a second calculation value extracted from the terminal identification information using the mask information, (ii) calculates a third calculation value indicating a value obtained by multiplying a preset interval of transmitting the beacon by the difference value, and (iii) stops the operation of the reception section until the timing based on a time obtained by adding the third calculation value to a time of receiving the beacon.

2. The radio terminal apparatus according to claim 1, wherein:

a terminal information memory of the radio relay apparatus stores information of each of a number of communicable radio terminal apparatuses, a control section of the radio relay apparatus generates the group identification information as information which indicates a classification into the number of groups of the number of the communicable radio terminal apparatuses, and the reception section of the radio terminal apparatus receives the beacon which includes the group identification information indicating the group to which the radio terminal apparatus belongs.

3. The radio terminal apparatus according to claim 1, wherein:

the beacon includes terminal identification information of a radio terminal apparatus to which data is to be transmitted, and if the beacon received by the reception section is addressed to the group to which the radio terminal apparatus belongs, the control section receives the data when the terminal identification information of the radio terminal apparatus itself is included in the beacon.

4. A radio terminal apparatus of a radio communication system which includes the radio terminal apparatus and a radio relay apparatus that periodically transmits a beacon, wherein the radio terminal apparatus includes a reception section which receives the beacon to perform data transmission/reception when an own address of the radio terminal apparatus exists in the beacon, the radio terminal apparatus comprising:

an identification information storage section which stores terminal identification information for identifying the radio terminal apparatus; and a control section which calculates a timing of starting the reception section based on group identification information included in the beacon received by the reception section and the stored terminal identification information, and which causes an operation of the reception section to be stopped until the calculated timing, wherein the group identification information indicates whether or not the received beacon is addressed to a group to which the radio terminal apparatus belongs, wherein the reception section receives the beacon including terminal type information indicating a type of radio terminal apparatus, and for every type of radio terminal apparatus, group identification information indicating a group to which the radio terminal apparatus to receive the beacon belongs, wherein the identification information storage section further stores the terminal type information indicating the type of the radio terminal apparatus itself, in addition to the terminal identification information for identifying the radio terminal apparatus itself, wherein the control section: (i) calculates the timing to start the reception section based on the terminal type information and the group identification information, both included in the beacon received by the reception section, and the terminal type information and the terminal identification information, both stored in the identification information storage section, and (ii) stops the operation of the reception section until the calculated timing, wherein the group identification information includes:

a sequence number which is a value that increases every transmission time of the beacon, and mask information which defines a value to be extracted from the sequence number based on a total number of groups of a plurality of radio terminal apparatuses classified by the type of the radio terminal apparatus indicated by the terminal type information, and wherein the control section: (i) extracts the mask information corresponding to the terminal type information included in the beacon based on the terminal type information stored in the identification information storage section, (ii) calculates a difference value between a first calculation value indicating the extracted value of the sequence number using the extracted mask information and a second calculation value extracted from the terminal identification information using the extracted mask information, (iii) calculates a third calculation value indicating a value obtained by multiplying a preset interval of transmitting the beacon by the difference value, and (iv) stops the operation of the reception section until the timing based on a time obtained by adding the third calculation value to a time of receiving the beacon.

5. The radio terminal apparatus according to claim 4, wherein:

a control section of the radio relay apparatus generates the beacon including the terminal type information and the group identification information, the terminal type information indicating the type of the radio terminal apparatus and classified based on an interval of reception of the beacon by the radio terminal apparatus, and the reception section of the radio terminal apparatus receives the beacon which includes the terminal type information of the radio terminal apparatus and the group identification information indicating the group to which the radio terminal apparatus belongs.

6. The radio terminal apparatus according to claim 4, wherein:

a terminal information memory of the radio relay apparatus stores information of each communicable radio terminal apparatus for every type of the radio terminal apparatuses, a control section of the radio relay apparatus generates the group identification information as information of classification into the groups to which the radio terminal apparatuses belong according to the terminal type information of the radio terminal apparatuses, and the reception section of the radio terminal apparatus receives the beacon which includes the terminal type information of the radio terminal apparatus and the group identification information indicating the group to which the radio terminal apparatus belongs.

7. The radio terminal apparatus according to claim 4, wherein the control section: (i) extracts the group identification information corresponding to the terminal type information included in the beacon based on the terminal type information stored in the identification information storage section, and (ii) judges whether the beacon received by the reception section is addressed to the group to which the radio terminal apparatus belongs among the groups classifying the types of radio terminal apparatuses, based on the extracted group identification information and the terminal identification information.

8. The radio terminal apparatus according to claim 4, wherein:

the beacon includes terminal identification information of a radio terminal apparatus to which the data is to be transmitted, and if the beacon received by the reception section is addressed to the group to which the radio terminal apparatus belongs, the control section receives the data by the reception section when the beacon includes the terminal identification information of the radio terminal apparatus itself.

9. A beacon reception method of a radio terminal apparatus which includes a reception section to perform communication by receiving a beacon, wherein the beacon is periodically transmitted from a radio relay apparatus which generates the beacon, and the beacon includes group identification information which indicates a group to which a given radio terminal apparatus to receive the beacon belongs, the method comprising:

storing terminal identification information which identifies the radio terminal apparatus;

receiving the beacon with the reception section, wherein the beacon includes the group identification information which indicates whether or not the received beacon is addressed to a group to which the radio terminal apparatus belongs; and calculating a timing of starting the reception section based on the group identification information included in the beacon received by the reception section and the stored terminal identification information, and stopping an operation of the reception section until the calculated timing, wherein the group identification information includes:

a sequence number which is a value that increases every transmission time of the beacon, and mask information which defines a value of the sequence number to be extracted based on a total number of classified groups of a plurality of the radio terminal apparatuses, and wherein the calculation of the timing of starting the reception section and the stopping of the operation of the reception section until the calculated timing comprises:

(i) calculating a difference value between a first calculation value indicating the extracted value of the sequence number using the mask information and a second calculation value extracted from the terminal identification information using the mask information, (ii) calculating a third calculation value indicating a value obtained by multiplying a preset interval of transmitting the beacon by the calculated difference value, and (iii) stopping the operation of the reception section until the timing based on a time obtained by adding the third calculation value to a time of receiving the beacon.

10. The beacon reception method of the radio terminal apparatus according to claim 9, further comprising:

storing terminal type information indicating a type of the radio terminal apparatus itself, in addition to the terminal identification information for identifying the radio terminal apparatus itself;

receiving the beacon by the reception section, the beacon including terminal type information indicating a type of radio terminal apparatus and for every type of radio terminal apparatus, group identification information indicating a group to which the radio terminal apparatus to receive the beacon belongs; and calculating the timing of starting the reception section based on the terminal type information and the group identification information, both included in the beacon received by the reception section, and the stored terminal type information and the stored terminal identification information, and stopping the operation of the reception section until the calculated timing.

11. A computer program product comprising a non-transitory computer-readable medium having a computer-readable program code embodied thereon, the program code being adapted to carry out all steps of claim 9.

12. A computer program product comprising a non-transitory computer-readable medium having a computer-readable program code embodied thereon, the program code being adapted to carry out all steps of claim 10.

* * * * *